(12) United States Patent
Lim et al.

(10) Patent No.: US 11,873,153 B2
(45) Date of Patent: Jan. 16, 2024

(54) IMPLANT STORAGE CONTAINER

(71) Applicant: PLASMAPP CO., LTD., Daejeon (KR)

(72) Inventors: Youbong Lim, Daejeon (KR);
Seunghun Lee, Seoul (KR); Junyoung Kim, Gyeongsan-si (KR)

(73) Assignee: PLASMAPP CO., LTD., Daejeon (KR)

( * ) Notice: Subject to any disclaimer, the term of this patent is extended or adjusted under 35 U.S.C. 154(b) by 487 days.

(21) Appl. No.: 17/058,731

(22) PCT Filed: Sep. 29, 2020

(86) PCT No.: PCT/KR2020/013384
§ 371 (c)(1),
(2) Date: Nov. 25, 2020

(87) PCT Pub. No.: WO2021/177527
PCT Pub. Date: Sep. 10, 2021

(65) Prior Publication Data
US 2022/0306368 A1    Sep. 29, 2022

(30) Foreign Application Priority Data

Mar. 4, 2020   (KR) .................. 10-2020-0027058
May 7, 2020    (KR) .................. 10-2020-0054652
(Continued)

(51) Int. Cl.
*B65D 81/20*        (2006.01)
*A61C 8/00*         (2006.01)

(52) U.S. Cl.
CPC ........ *B65D 81/2038* (2013.01); *A61C 8/0087* (2013.01)

(58) Field of Classification Search
CPC ............ B65D 81/2007; B65D 81/2038; A61C 8/0087; A61C 19/02
(Continued)

(56) References Cited

U.S. PATENT DOCUMENTS 5,062,800 A * 11/1991 Niznick ............... A61C 8/0087
                                                        433/229
5,322,443 A *  6/1994 Beaty .................. A61C 8/0087
                                                        433/141
(Continued)

FOREIGN PATENT DOCUMENTS

FR          2746629 A1 * 10/1997
KR    10-2014-0101261 A    8/2014
(Continued)

OTHER PUBLICATIONS

Notice of Opinion Submission dated Dec. 10, 2020 from the Korean Intellectual Property Office in KR Application No. 10-2020-0124911.

*Primary Examiner* — Luan K Bui
(74) *Attorney, Agent, or Firm* — Sughrue Mion, PLLC

(57) ABSTRACT

An implant storage container according to an embodiment of present invention comprises an implant body, a holding block connected to the implant body, a cover storing the implant body and connected to the holding block and a sealing member configured to seal a boundary between the holding block and the cover to maintain a vacuum state inside the cover.

13 Claims, 18 Drawing Sheets

(30) Foreign Application Priority Data

Jun. 18, 2020 (KR) .......................... 10-2020-0074260
Jul. 15, 2020 (KR) .......................... 10-2020-0087734
Sep. 25, 2020 (KR) .......................... 10-2020-0124911

(58) Field of Classification Search
USPC ..... 206/63.5, 368, 438, 524.8; 433/173, 174
See application file for complete search history.

(56) References Cited

U.S. PATENT DOCUMENTS

| | | | | |
|---|---|---|---|---|
| 5,558,230 | A * | 9/1996 | Fischer | A61C 8/0087 |
| | | | | 206/570 |
| 5,692,904 | A * | 12/1997 | Beaty | A61C 8/0089 |
| | | | | 433/141 |
| 6,247,932 | B1 * | 6/2001 | Sutter | A61C 8/0087 |
| | | | | 433/173 |
| 2020/0000559 | A1 * | 1/2020 | Chung | A61C 8/0087 |

FOREIGN PATENT DOCUMENTS

| | | |
|---|---|---|
| KR | 10-1439344 A | 9/2014 |
| KR | 10-1693335 B1 | 1/2017 |
| KR | 10-1705830 B1 | 2/2017 |
| KR | 10-2018-0015054 A | 2/2018 |
| KR | 10-2018-0015057 A | 2/2018 |
| KR | 10-2064955 B1 | 1/2020 |

* cited by examiner

IMPLANT STORAGE CONTAINER

CROSS REFERENCE TO RELATED APPLICATIONS

This application is a National Stage of International Application No. PCT/KR2020/013384 filed Sep. 29, 2020, claiming priorities based on Korean Patent Application No. 10-2020-0027058 filed Mar. 4, 2020, Korean Patent Application No. 10-2020-0054652 filed May 7, 2020, Korean Patent Application No. 10-2020-0074260 filed Jun. 18, 2020, Korean Patent Application No. 10-2020-0087734 filed on Jul. 15, 2020 and Korean Patent Application No. 10-2020-0124911 filed on Sep. 25, 2020.

TECHNICAL FIELD

The present disclosure relates to an implant storage container, and more particularly, to an implant storage container in which the interior of the storage container for storing an implant fixture is made into a vacuum state.

BACKGROUND ART

An implant means a substitute that restores human tissues when the human tissues are lost, and in dentistry, the implant means an artificial tooth structure.

In an implant procedure, an artificial tooth root made of a material (e.g., titanium, etc.) that is not rejected by the human body is planted in the bone to replace a tooth root of a lost tooth. Then, the artificial tooth root is adhered to an alveolar bone, and a prosthesis is fixed thereto to form an artificial tooth structure.

In general, a dental implant includes a fixture made of titanium and implanted in an alveolar bone, an abutment fixed on the fixture to support a prosthesis, an abutment screw to fix the abutment to the fixture, and a prosthesis as an artificial tooth fixed to the abutment.

Because components of the dental implant are inserted into tissues of the human body, sterilization and surface activation need to be maintained. Therefore, the most important task is to prevent contamination or damage during packaging, transportation, and opening of a package.

DESCRIPTION OF EMBODIMENTS

Technical Problem

Provided is a structure that allows vacuum sealing to prevent contamination and damage to implants stored in a storage container.

Provided is a storage container for storing an implant which is treated by plasma or ultraviolet ray for surface modification, and the storage container includes a dielectric layer for discharging a dielectric barrier or a configuration for applying an electrode or a material through which ultraviolet rays pass.

Provided is an implant storage container having characteristics according to plasma treatment of a target object such as a biomaterial, a device for the same, and a method using the same.

Provided is an implant storage container in which devices may be simplified by applying electricity to a target object to replace a high-voltage portion for generating plasma, a device for the same, and a method using the same.

Provided is an implant storage container that prevents damage due to connection of a connector of a device for applying electricity to a target object or its connection member by a point contact by changing the connector of the device to be in line or face contact with a side surface of the target object, a device for the same, and a method using the same.

Provided is an implant storage container capable of forming a vacuum state of a plasma processing space to ensure sterility of the plasma processing space, a device for the same, and a method using the same.

Provided is an implant storage container capable of maintaining sterility and biocompatibility by maintaining a vacuum state after plasma surface treatment is completed, a device for the same, and a method using the same.

Provided is an implant storage container capable of preventing contamination during processing by moving a fixture to a vacuum chamber in surface treatment using plasma in a vacuum state, a device for the same, and a method using the same.

Provided is an implant storage container including a cover that stores an implant body therein and maintains an internal gas environment filled with a discharge gas used for plasma discharge according to a preset composition ratio.

Solution to Problem

According to an embodiment, an implant storage container may comprises an implant body, a holding block connected to the implant body, a cover storing the implant body and connected to the holding block and a sealing member configured to seal a boundary between the holding block and the cover to maintain a vacuum state inside the cover.

In some embodiments, the sealing member may be an elastic O-ring or sealing pad.

In some embodiments, the sealing member may include a recoverable elastic material, and when internal air of the cover is exhausted, an air circulation path is temporarily formed in the sealing member and then closed.

In some embodiments, the cover may include an inner cover storing the implant body and an outer cover storing the inner cover, and the sealing member seals a boundary between the outer cover and the holding block to maintain a vacuum state inside the outer cover.

In some embodiments, the inner cover may include a path for circulating internal air from the inner cover to the outer cover.

In some embodiments, the outer cover may be separated from the holding block, and the inner cover may be separated from both the outer cover and the holding block.

In some embodiments, the inner cover may include a dielectric area for dielectric barrier discharge.

In some embodiments, the holding block may include a hole for exhausting internal air of the cover.

In some embodiments, the hole may include a recovery structure for maintaining the inside of the cover in a vacuum after the internal air of the cover is exhausted.

In some embodiments, in the recovery structure, when the internal air of the cover is exhausted, an air circulation path may be temporarily formed in the recovery structure and then closed so that the inside of the cover maintains a vacuum.

In some embodiments, the cover may includes a valve port for exhausting internal air of the cover.

In some embodiments, the implant storage container may further comprises an electrical terminal on an outer surface of the holding block and an electrical connector configured to connect the electrical terminal to the implant body.

In some embodiments, the cover may include a dielectric area for dielectric barrier discharge.

In some embodiments, the dielectric area may be capable of transmitting ultraviolet rays.

According to another aspect of an embodiment, an implant storage container includes: a fixing portion that contacts a target object and fixes the target object; and a cover storing the fixing portion, wherein the fixing portion contacts a side portion of a contact portion inserted into the cover from the outside of the cover to receive electricity from the contact portion.

In some embodiments, the fixing portion and the target object may include a material through which electricity is conducted, and the target object may be a power supply for generating plasma by the electricity received from the contact portion.

In some embodiments, the cover includes a first area penetrated by the contact portion, wherein the first area includes an elastic material so that the inside of the cover may be sealed to maintain a vacuum state even if the first area is penetrated by the contact portion.

In some embodiments, in the cover, internal air is exhausted by the contact portion, so that the inside of the cover may be in a vacuum state.

In some embodiments, the fixing portion may include an inwardly convex protrusion, wherein the protrusion may contact a side portion of the contact portion inserted inwardly.

In some embodiments, the fixing portion may include a first fixing member in contact with the target object; and a second fixing member coupled to the first fixing member, wherein the first fixing member and the second fixing member include a material through which electricity is conducted, and electricity received by the second fixing member in contact with the contact portion may be transmitted to the target object.

In some embodiments, an inner angle of an insertion groove formed by the protrusion may be greater than an inner angle of a tip of the contact portion.

In some embodiments, the first fixing member may include a D-cut portion in which a portion of an outer circumferential surface is cut into a planar shape, and may be fixed so that the target object does not rotate.

In some embodiments, the cover may include an inner cover storing the target object and the fixing portion; and an outer cover storing the inner cover, wherein the inner cover and the outer cover may be apart from each other by a certain distance.

In some embodiments, the implant storage container may further include a sealing member connected to the cover, wherein the sealing member includes a penetrating portion penetrated by the contact portion, and the penetrating portion includes an elastic material, and thus, the inside of the cover is sealed to maintain a vacuum state even if the penetrating portion is penetrated by the contact portion.

In some embodiments, an elastic O-ring or sealing pad may be further included between the sealing member and the cover.

In some embodiments, the inner cover may include a path for distributing internal air of the inner cover toward the outer cover.

In some embodiments, the implant storage container may further include a sealing member connected to the outer cover; and an O-ring or sealing pad having elasticity between the sealing member and the outer cover, wherein the sealing member may be connected to the inner cover, and the inner cover may be connected to the outer cover through a cap having elasticity. As internal air of the outer cover is exhausted, the inside of the outer cover is sealed to maintain a vacuum state by the elastic O-ring or sealing pad. As the internal air of the outer cover is exhausted, inner pressure of the outer cover increases, so that coupling between the inner cover and the outer cover is strengthened through the cap portion. Also, as the inside of the outer cover is vented, inner pressure of the outer cover decreases, so that coupling between the inner cover and the outer cover may be weakened through elastic recovery of the cap portion.

According to another aspect of an embodiment, a plasma processing device includes: a storage portion for storing a container in which a target object is stored; a contact portion inserted into the inner side of the container and electrically connected to the target object at its side; and a power supply applying power for generating plasma to the target object through the contact portion.

In some embodiments, the contact portion may include a tip portion capable of penetrating an outer surface of the container.

In some embodiments, the contact portion may include an air flow path for exhausting internal air of the container therein.

In some embodiments, a hole formed in the contact portion for exhausting the internal air of the container may be formed at a position farther from the target object than an electrical contact between the contact portion and the target object.

In some embodiments, the plasma processing device may further include an exhaust portion connected to the air flow path of the contact portion to exhaust the internal air of the container, wherein the contact portion includes a material through which electricity is conducted, and may further include an insulating portion in a path connected to the exhaust portion of the contact portion.

In some embodiments, the plasma processing device may further include a ground electrode portion adjacent to an outer circumferential surface of the container, connected to the power supply, and grounded.

In some embodiments, the storage portion may further include a fixing portion in which the container is stored and fixed.

According to another aspect of an embodiment, a plasma processing method includes: storing a container in which a target object is stored; moving a side portion of the contact portion to the inside of the container to be electrically connected to the target object; exhausting the internal air of the container through the contact portion; and applying power for generating plasma to the target object through the contact portion.

In some embodiments, the plasma processing method may include detecting storage of the container and applying the power when the container is stored.

According to another aspect of an embodiment, an implant storage container includes: an implant body; a cover storing the implant body therein; and a storage container body connected to the cover to maintain an internal gas environment filled with a discharge gas used for plasma discharge in a sealed state according to a preset composition ratio.

According to an embodiment, the implant storage container may further include a sealing member sealing a boundary between the storage container body and the cover.

According to an embodiment, the sealing member may be an elastic O-ring or a sealing pad.

According to an embodiment, the storage container body includes an elastic material, and may further include a recoverable penetrating portion through which a gas distribution path is temporarily formed when the discharge gas is injected into the cover and the gas distribution path is closed.

According to an embodiment, the implant storage container may further include a display unit displaying information about the internal gas environment on an outer surface of the storage container body or an outer surface of the cover.

According to an embodiment, the display unit may display at least one of the type of the discharge gas filled in the implant storage container, a composition ratio of the discharge gas, an internal pressure of the discharge gas, and a usable period.

According to an embodiment, the implant storage container may further include a fixing portion connected to the implant body to fix the implant body.

According to an embodiment, the fixing portion may include a first fixing member connected to the implant body and a second fixing member coupled to the first fixing member.

According to an embodiment, the first fixing member and the second fixing member include a material through which electricity is conducted and a voltage applied to the second fixing member may be transmitted to the implant body.

According to an embodiment, the implant body may operate as one electrode used for dielectric barrier discharge when a voltage is applied.

According to an embodiment, the discharge gas may include helium gas, neon gas, argon gas, krypton gas, xenon gas, radon gas, nitrogen gas, hydrogen selenide gas, deuterium gas, fluorine gas, chlorine gas, bromine gas, iodine gas, hydrogen gas, mercury gas, or a combination of the above gases.

According to an embodiment, the cover may include an inner cover storing the implant body and an outer cover storing the inner cover, wherein the inner cover and the outer cover may be apart from each other by a certain distance.

According to an embodiment, the inner cover may be provided with a protruding handle.

According to an embodiment, the inner cover may include a path for passing gas between the inner cover and the outer cover.

Advantageous Effects of Disclosure

Devices according to an embodiment enable vacuum sealing for maintaining sterilization and preventing damage and contamination of a stored implant.

In addition, the devices according to an embodiment enable vacuum sealing to increase the efficiency of dielectric barrier discharge in plasma surface treatment of the stored implant.

In addition, the devices according to an embodiment have a configuration for a dielectric layer and an applied electrode for plasma surface treatment of the stored implant, so that the devices may be connected to a treatment device with lower cost and higher efficiency.

In addition, the devices according to an embodiment include an ultraviolet transmissive material for ultraviolet surface treatment of the stored implant, so that the devices may be connected to a highly efficient processing device.

In addition, the devices according to an embodiment may maximize the efficiency of surface treatment by performing plasma surface treatment and ultraviolet surface treatment on the stored implant together.

In addition, the devices according to an embodiment, by sealing an implant fixture in a vacuum state, may prevent organic matter from adhering to a surface of the fixture.

In addition, the devices according to an embodiment may improve biocompatibility by surface treating the implant fixture in a packaged state to remove organic matter on the surface of the fixture.

A container, device, and methods according to an embodiment have characteristics according to plasma treatment of a target object such as a biomaterial.

In addition, the container, device, and methods according to an embodiment may simplify the device by functioning by applying electricity from the high-voltage portion for generating plasma to the target object.

In addition, the container, device, and methods according to an embodiment prevent damage to a configuration of a device for a connection point by making the connection point for applying electricity to the target object as a line contact or a surface contact instead of a point contact, and reduce the difficulty of an operation for forming the connection point.

In addition, the container, device, and methods according to an embodiment enable uniform and stable plasma surface treatment in a vacuum, and have high spatial uniformity and improved surface treatment performance.

In addition, the container, device, and methods according to an embodiment may ensure sterility of a plasma processing space.

In addition, the container, device, and methods according to an embodiment enable vacuum sealing to maintain sterilization and prevent damage and contamination for a plasma-treated target object.

In addition, the container, device, and methods according to an embodiment may maintain sterility and biocompatibility by allowing the target object to be stored in a vacuum state after the plasma surface treatment is completed.

In addition, the container, device, and methods according to an embodiment prevent contamination in a process of moving a fixture to a vacuum chamber in surface treatment using plasma in a vacuum.

A device and method according to an embodiment may be kept sealed to prevent contamination and damage to the stored implant body and to maintain a sterile state.

In addition, the device and method according to an embodiment may be used for plasma treatment in an optimized state of an implant storage container storing an implant body, as an internal gas environment filled with a discharge gas used for plasma discharge is maintained in a sealed state according to a preset composition ratio.

In addition, the device and method according to an embodiment may perform effective plasma treatment of an implant body by operating as one electrode used for dielectric barrier discharge as a voltage is applied to the implant body.

In addition, the device and method according to an embodiment may effectively manage an implant storage container by displaying at least one of the type of a discharge gas filled in the implant storage container, a composition ratio of the discharge gas, internal pressure of the discharge gas, and a usable period through a display unit outside the implant storage container.

BRIEF DESCRIPTION OF DRAWINGS

The above and other aspects, features, and advantages of certain embodiments of the present disclosure will be more apparent from the following description taken in conjunction with the accompanying drawings, in which.

BEST MODE

Figure 1:
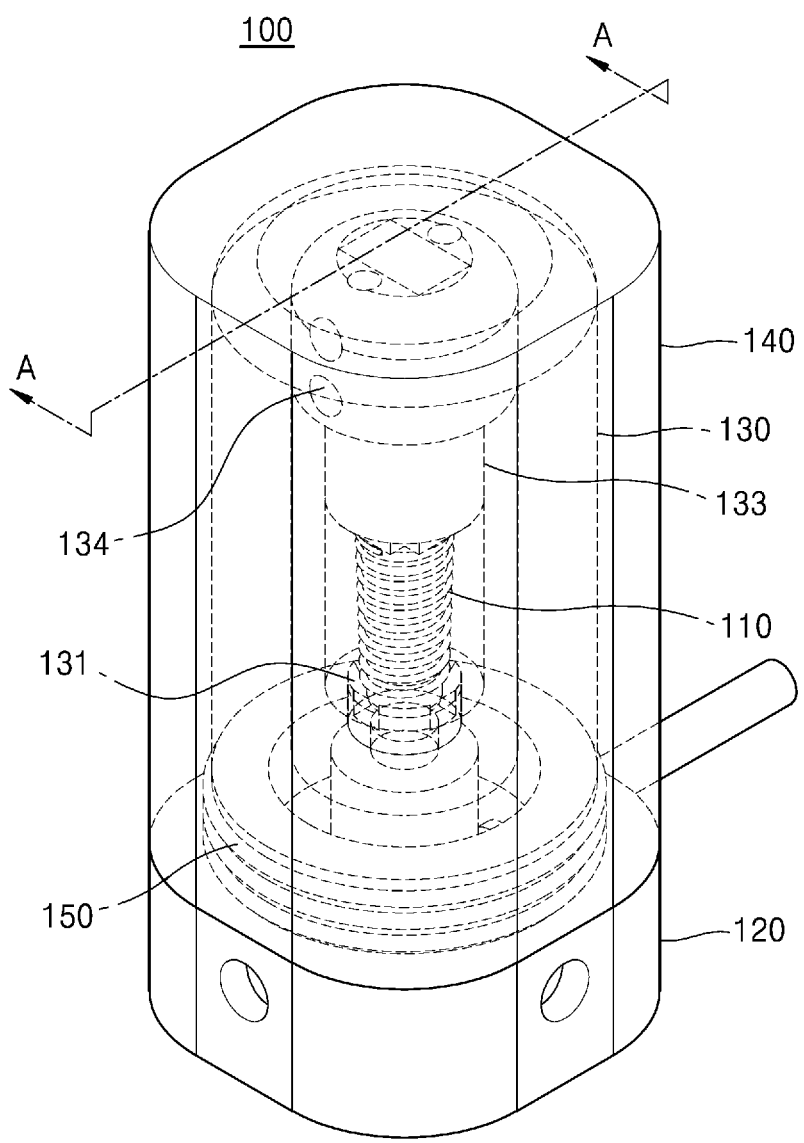
FIG. 1 is a configuration diagram of an implant storage container according to an embodiment.

The inventive concept may be variously modified and have various embodiments, so that specific embodiments will be illustrated in the drawings and described in the detailed description. However, this does not limit the inventive concept to specific embodiments, and it should be understood that the inventive concept covers all the modifications, equivalents and replacements included within the idea and technical scope of the inventive concept.

In describing the inventive concept, in the following description, a detailed explanation of known related technologies may be omitted to avoid unnecessarily obscuring the subject matter of the present disclosure. In addition, numeral figures (e.g., 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit," "er," "or," "module," and the like disclosed in the specification mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software. Furthermore, the terms may be implemented in a form coupled to a memory that stores data necessary for processing at least one function or operation.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, embodiments of the disclosure will be described in detail.

Figure 2:
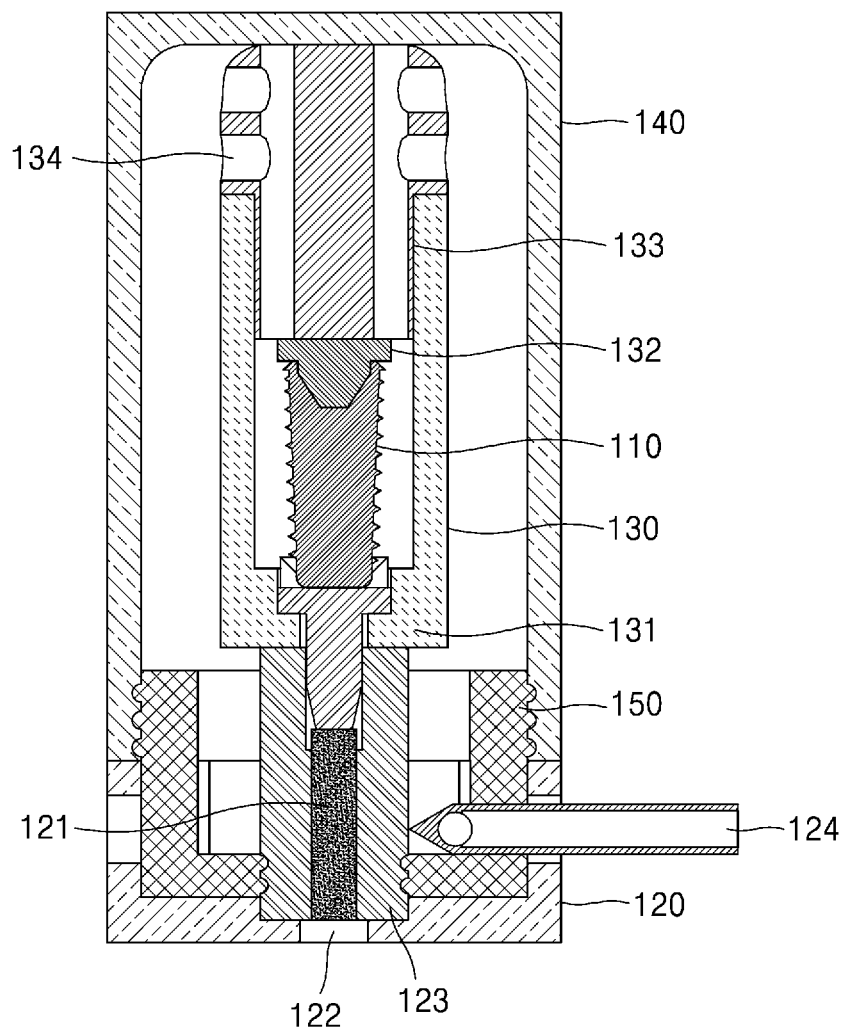
FIG. 2 is a cross-sectional view of the implant storage container taken along line A-A of FIG. 1.

FIG. 1 is a configuration diagram of an implant storage container according to an embodiment, and FIG. 2 is a cross-sectional view of the implant storage container taken along line A-A of FIG. 1.

Referring to FIGS. 1 and 2, an implant storage container 100 according to an embodiment includes an implant body 110, a holding block 120 connected to the implant body 110, covers 130 and 140 storing the implant body 110 and connected to the holding block 120, and a sealing member 150 capable of maintaining a vacuum state inside the covers 130 and 140 by sealing a boundary between the holding block 120 and the covers 130 and 140.

The implant storage container 100 may store the implant body 110 by accommodating the implant body 110 therein. The implant storage container 100 may be referred to as an implant ampoule or the like.

According to an embodiment, the implant body 110 is inserted into an alveolar bone and configured as a certain structure supporting an artificial tooth. According to an embodiment, the implant body 110 extends in a vertical direction and has a shape of a column as a whole, and may include a material such as titanium that is harmless to the human body and is easily fused with bone tissue, but is not limited thereto. Therefore, any material having properties similar to those described above may be used.

In addition, according to an embodiment, the implant body 110 may have a screw-like shape and have a structure that increases a contact area with the periphery, and may have a configuration in which an outer diameter is expanded or contracted in one direction.

The implant body 110 may be a target to be stored by the implant storage container 100 and may be a target to be plasma treated when plasma treatment is performed with the implant storage container 100.

According to an embodiment, the implant body 110 may be replaced with another target object through which electricity is conducted.

According to an embodiment, the implant body 110 may broadly mean a portion of an implant requiring plasma treatment. For example, the implant body 110 may be an implant fixture, but is not limited thereto.

The implant body 110 is stored in the covers 130 and 140. The covers 130 and 140 may have a cylindrical or rectangular parallelepiped body.

According to an embodiment, the covers 130 and 140 may include the inner cover 130 storing the implant body 110 and the outer cover 140 storing the inner cover 130.

According to an embodiment, the outer cover 140 includes a resin material.

According to an embodiment, the outer cover 140 is sealed at a boundary with the holding block 120 through the sealing member 150, so that a vacuum state inside the outer cover 140 may be maintained. In addition, the outer cover 140 may be connected to the holding block 120 through the sealing member 150 to form a vacuum boundary condition.

According to an embodiment, the inner cover 130 may be provided with support units 131 and 132 on which the implant body 110 is mounted and supported to support the implant body 110 to a certain height. The support units 131 and 132 may include the lower support unit 131 for fixing and supporting the implant body 110 by being located under the implant body 110, and the upper support unit 132 for fixing and supporting the implant body 110 by being located above the implant body 110.

In the present specification, the "support unit" may broadly mean a structure for supporting or fixing the implant body 110 regardless of the arrangement, and may be referred to as a "fixing portion" according to embodiments.

According to an embodiment, the support units 131 and 132 may include the same material as that of the implant body 110 or a material that is harmless to the human body such as titanium and is easily fused with bone tissue to prevent contamination and damage of the implant body 110.

According to an embodiment, the inner cover 130 includes an inner cover cap 133 for pressing and fixing the upper support units 132 by elasticity.

The inner cover cap 133 has elasticity and applies elastic pressure to the upper support unit 132 to fix the implant body 110.

According to an embodiment, the inner cover cap 133 includes a path 134 for distributing internal air of the inner cover 130 from the inner cover 130 to the outer cover 140.

According to an embodiment, the inner cover cap 133 includes a silicone material.

According to an embodiment, the inner cover 130 may include a dielectric material and may be a dielectric area for dielectric barrier discharge. In addition, a portion of an outer circumferential surface of the inner cover 130 may include a dielectric material to become the dielectric area for dielectric barrier discharge.

According to an embodiment, the inner cover 130 includes low-expansion heat-resistant glass. For example, the inner cover 130 includes borosilicate glass.

According to an embodiment, the outer cover 140 may be a ground area for dielectric barrier discharge. In addition, a portion of an outer peripheral surface of the outer cover 140 may be configured to be a ground area for dielectric barrier discharge.

According to an embodiment, the outer cover 140 includes a non-conductor through which electricity does not flow, so that even if electricity is applied to the implant body 110, user safety on the outer surface may be secured.

According to an embodiment, the inner cover 130 and the outer cover 140 are capable of transmitting ultraviolet rays to enable ultraviolet treatment of the implant body 110.

Through this, surface treatment efficiency for the implant body 110 of the covers 130 and 140 is improved as plasma surface treatment or ultraviolet treatment may proceed sequentially, independently, or simultaneously in a state in which an internal vacuum is formed.

The holding block 120 is connected to the implant body 110.

In the present specification, the "holding block" may broadly mean a structure for directly or indirectly supporting or fixing the implant body 110, and may be referred to as a "storage container body" or the like according to embodiments.

According to an embodiment, the holding block 120 includes an electrical terminal 122 on an outer surface thereof and an electrical connector 121 connecting the electrical terminal 122 to the lower support unit 131, and is connected to the implant body 110.

According to an embodiment, the electrical connector 121 includes a metal material capable of electrical connection, and is connected to the electrical terminal 122 exposed on an outer surface of the implant storage container 100.

According to an embodiment, the electrical terminal 122 is connected to an external power source and applies power to the implant body 110 through the electrical connector 121 and the lower support units 131 so that the implant body 110 becomes an electrode for dielectric barrier discharge.

According to an embodiment, the holding block 120 includes an insulating portion 123 on an outer periphery of the electrical connector 121 to prevent a risk of damage due to electrical distribution to other structures when electricity is applied through the electrical connector 121.

According to an embodiment, the holding block 120 includes a hole 124 for exhausting internal air of the covers 130 and 140.

According to an embodiment, the hole 124 includes a plurality of flow paths and a plurality of holes for exhausting the internal air of the covers 130 and 140.

The hole 124 is a recovery structure for maintaining the inside of the covers 130 and 140 in a vacuum after the internal air of the covers 130 and 140 is exhausted, and includes a sealing pad (not shown).

The sealing pad includes an elastic material, and an air circulation path is temporarily formed when the internal air of the covers 130 and 140 is exhausted and then closed through elastic recovery so that the inside of the covers 130 and 140 maintains a vacuum.

Through this, the implant body 110 is blocked from external air and thus plasma surface treatment is possible without being exposed to contamination.

According to an embodiment, the holding block 120 and the insulating portion 123 include a resin material.

The sealing member 150 seals a boundary between the holding block 120 and the covers 130 and 140 to maintain a vacuum state inside the covers 130 and 140.

According to an embodiment, the sealing member 150 seals a boundary between the outer cover 140 and the holding block 120 to maintain a vacuum state inside the outer cover 140.

In addition, according to an embodiment, the sealing member 150 forms a boundary condition of a vacuum on a surface to which the holding block 120 and the covers 130 and 140 are connected.

According to an embodiment, the sealing member 150 includes an O-ring or sealing pad having elasticity.

According to an embodiment, the sealing member 150 includes an elastic material. Through this, the sealing member 150 may form an air circulation path temporarily when a hole for air circulation is passed by a sharp object having a small diameter such as a needle to exhaust the internal air of the covers 130 and 140. In addition, the sealing member 150 may achieve recovery in which the air circulation path is elastically closed after the internal air is exhausted.

According to an embodiment, the sealing member 150 includes a silicone material.

According to an embodiment, the outer cover 140 is connected to the holding block 120 by a detachable coupling structure, and the inner cover 130 is fixed to the outer cover 140 and the holding block 120 by elasticity of the inner cover cap 133.

Accordingly, when the outer cover 140 and the holding block 120 are separated from each other, the inner cover 130 is separated from both the outer cover 140 and the holding block 120.

According to an embodiment, when the inner cover 130 is separated from the holding block 120, the inner cover 130 is independently separated from the outer cover 140 and the holding block 120.

Figure 3:
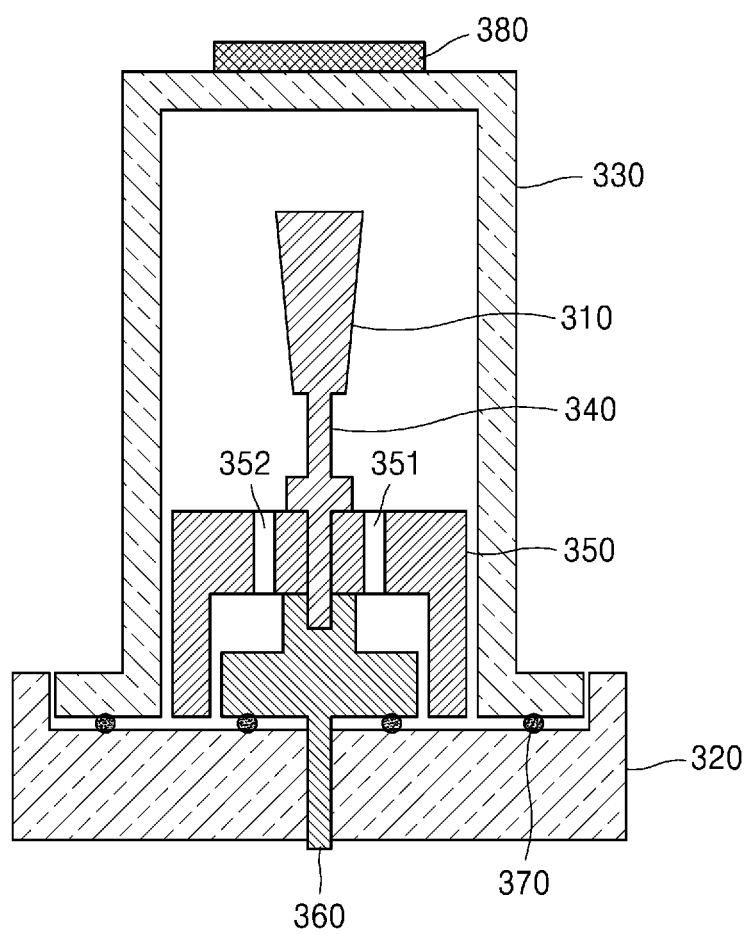
FIG. 3 is a configuration cross-sectional view of an implant storage container according to another embodiment.

FIG. 3 is a configuration cross-sectional view of an implant storage container according to another embodiment.

Referring to FIG. 3, an implant storage container 300 according to another embodiment includes an implant body 310, a holding block 320 connected to the implant body 310, a cover 330 storing the implant body 310 and connected to the holding block 320, and a sealing member 370 capable of maintaining a vacuum state inside the cover 330 by sealing a boundary between the holding block 320 and the cover 330.

According to an embodiment, the implant body 310 is fixedly coupled to an extension member 340, the extension member 340 is fixedly coupled to a base plate 350, and the base plate 350 is connected to the holding block 320.

In addition, according to an embodiment, the holding block 320 includes an electrical connector 360 penetrating therethrough, wherein the electrical connector 360 is exposed on an outer surface of the holding block 320, is connected to the extension member 340, and receives external power through the exposed outer surface to apply a voltage to the implant body 310.

According to an embodiment, the electrical connector 360 is provided in each of the inner cover 130 and the outer cover 140, and when the inner cover 130 is independently separated from the outer cover 140 and the holding block 120, may be configured such that an electrical connector on the inner cover 130 side and an electrical connector on the outer cover 140 side are separated from each other.

According to an embodiment, the electrical connector 360 receives electricity from an external power source and applies electricity to the implant body 310 such that plasma surface treatment may be performed.

In addition, according to an embodiment, the sealing member 370 applies electricity to the implant body 310 to form and maintain a vacuum state inside the cover 330 while plasma surface treatment is performed.

According to an embodiment, the cover 330 includes a valve port 380 for exhausting internal air of the cover 330. In addition, the valve port 380 may be a check valve port capable of opening and closing.

According to an embodiment, the valve port 380 may be configured by minimizing an area exposed to a vacuum in order to maintain the vacuum in a closed structure, but to reduce a force required when venting is required by evacuating.

According to an embodiment, the base plate 350 includes vacuum channel holes 351 and 352 such that internal air is more smoothly exhausted.

According to an embodiment, the cover 330 includes a dielectric.

According to an embodiment, the sealing member 370 is a vacuum sealing O-ring or a rubber-injected sealing pad.

Figure 4:
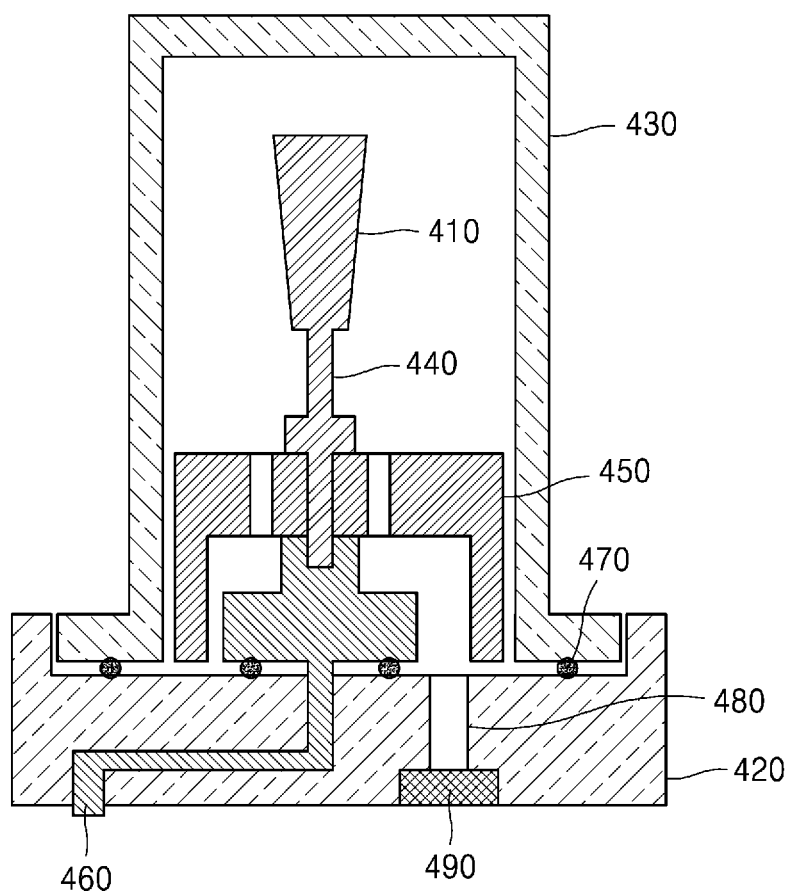
FIG. 4 is a configuration cross-sectional view of an implant storage container according to another embodiment.

FIG. 4 is a configuration cross-sectional view of an implant storage container according to another embodiment.

Referring to FIG. 4, an implant storage container 400 according to another embodiment includes an implant body 410, a holding block 420 connected to the implant body 410, a cover 430 storing the implant body 410 and connected to the holding block 420, and a sealing member 470 capable of maintaining a vacuum state inside the cover 430 by sealing a boundary between the holding block 420 and the cover 430.

According to an embodiment, the implant body 410 is fixedly coupled to an extension member 440, the extension member 440 is fixedly coupled to a base plate 450, and the base plate 450 is connected to the holding block 420.

Also, according to an embodiment, the holding block 420 includes an electrical connector 460 which is bent but penetrated therethrough, wherein the electrical connector 460 is exposed on an outer surface of the holding block 420, is connected to the extension member 440, and receives external power through the exposed outer surface to apply a voltage to the implant body 410.

Compared to the implant body 410 to be located in the center of the implant storage container 400, the electrical connector 460 is bent so that external power is applied off the center or from the side.

According to an embodiment, the holding block 420 includes an exhaust hole 480 for exhausting internal air of the cover 430 and a vacuum pumping port 490 having elasticity to block the exhaust hole 480.

Figure 5:
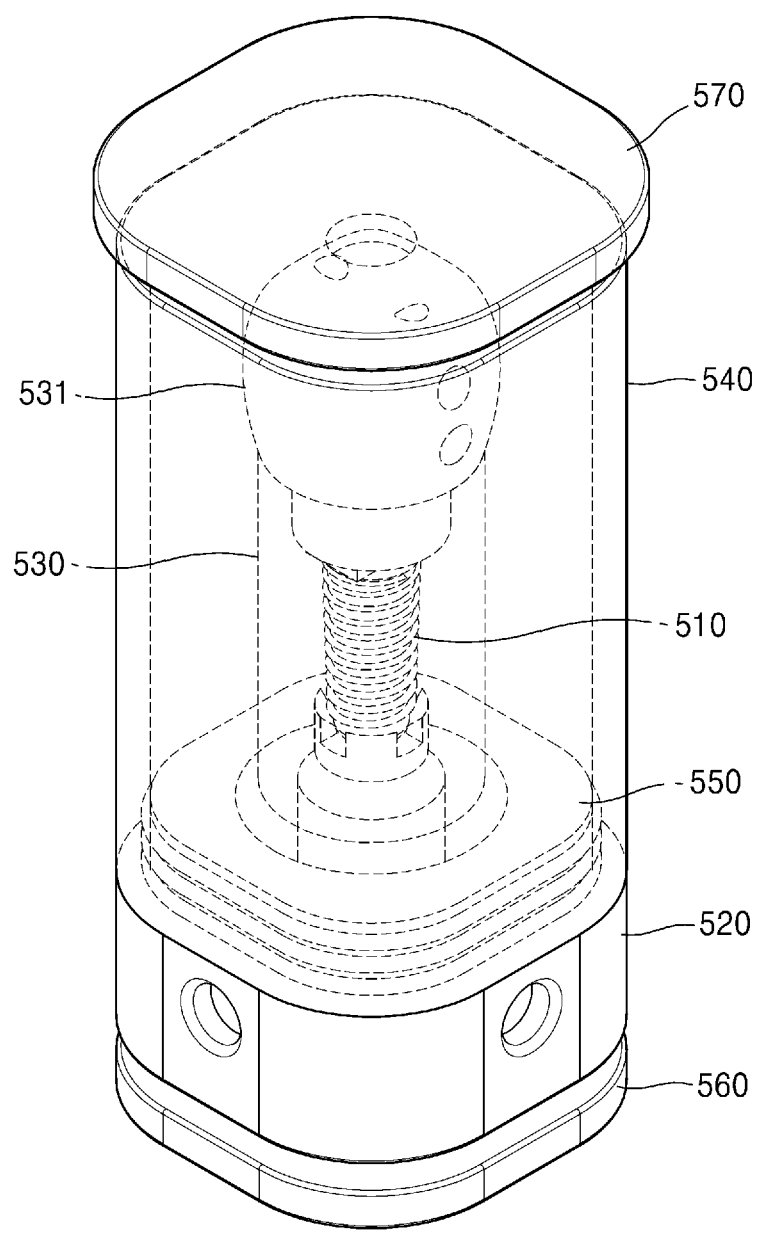
FIG. 5 is a configuration diagram of an implant storage container according to another embodiment.

FIG. 5 is a configuration diagram of an implant storage container according to another embodiment.

Referring to FIG. 5, an implant storage container 500 according to another embodiment includes an implant body 510, a holding block 520 connected to the implant body 510, covers 530 and 540 storing the implant body 510 and connected to the holding block 520, and a sealing member 550 capable of maintaining a vacuum state inside the covers 530 and 540 by sealing a boundary between the holding block 520 and the covers 530 and 540.

In addition, the implant storage container 500 further includes a first venting member 560 for venting to release the vacuum state inside the covers 530 and 540.

The first venting member 560 is configured to generate a path through which external air flows into the covers 530 and 540 by changing the shape of the sealing member 550 by pressing the sealing member 550 in contact with the elastic sealing member 550.

In addition, the implant storage container 500 further includes a second venting member 570 for venting to release the vacuum state inside the cover 530.

According to an embodiment, the covers 530 and 540 may include the inner cover 530 storing the implant body 510 and the outer cover 540 storing the inner cover 530.

According to an embodiment, the inner cover 530 has elasticity and includes an inner cover cap 531.

The second venting member 570 is in contact with the inner cover cap 531 through a hole of the outer cover 540, and the vacuum state inside the covers 530 and 540 is maintained by elastic properties of the cover cap 531.

The second venting member 570 is configured to generate a path through which external air flows into the covers 530 and 540 by changing the shape of an inner cover tab 533 by pressing the inner cover cap 533.

Figure 6:
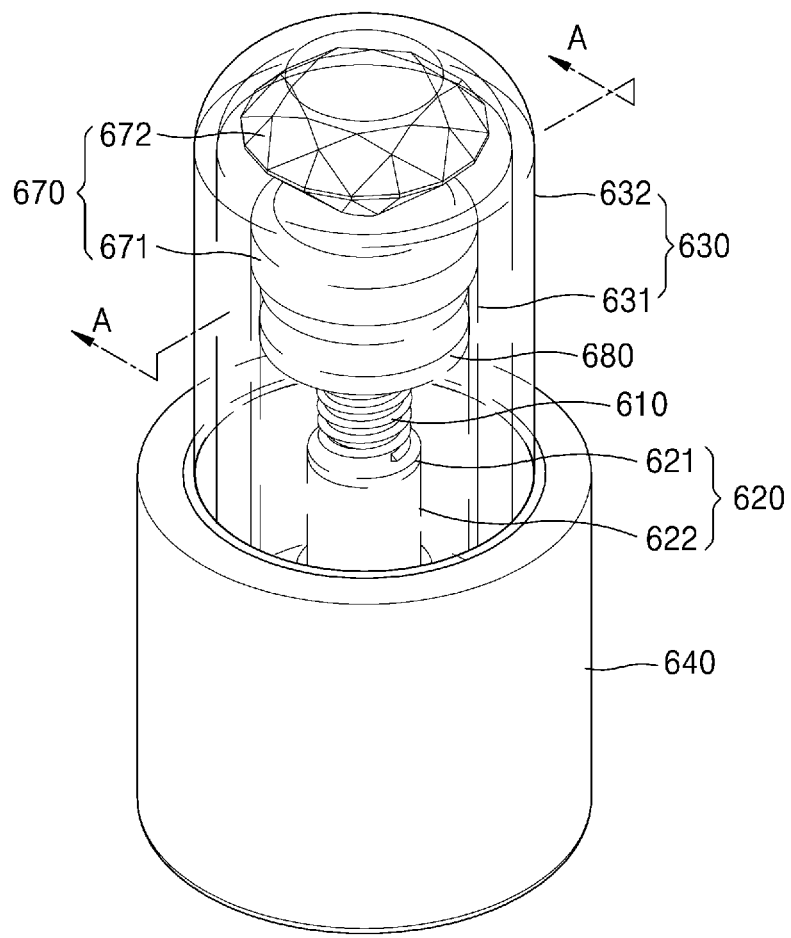
FIG. 6 is a configuration diagram of an implant storage container according to an embodiment.

FIG. 6 is a configuration diagram of an implant storage container according to an embodiment.

Referring to FIG. 6, the implant storage container according to an embodiment includes a fixing portion 620 for fixing a target object 610 in contact with the target object 610 and a cover 630 for storing the fixing portion 620.

According to an embodiment, the target object 610 may be an implant body.

According to an embodiment, the cover 630 is transparent and includes polycarbonate.

Figure 7:
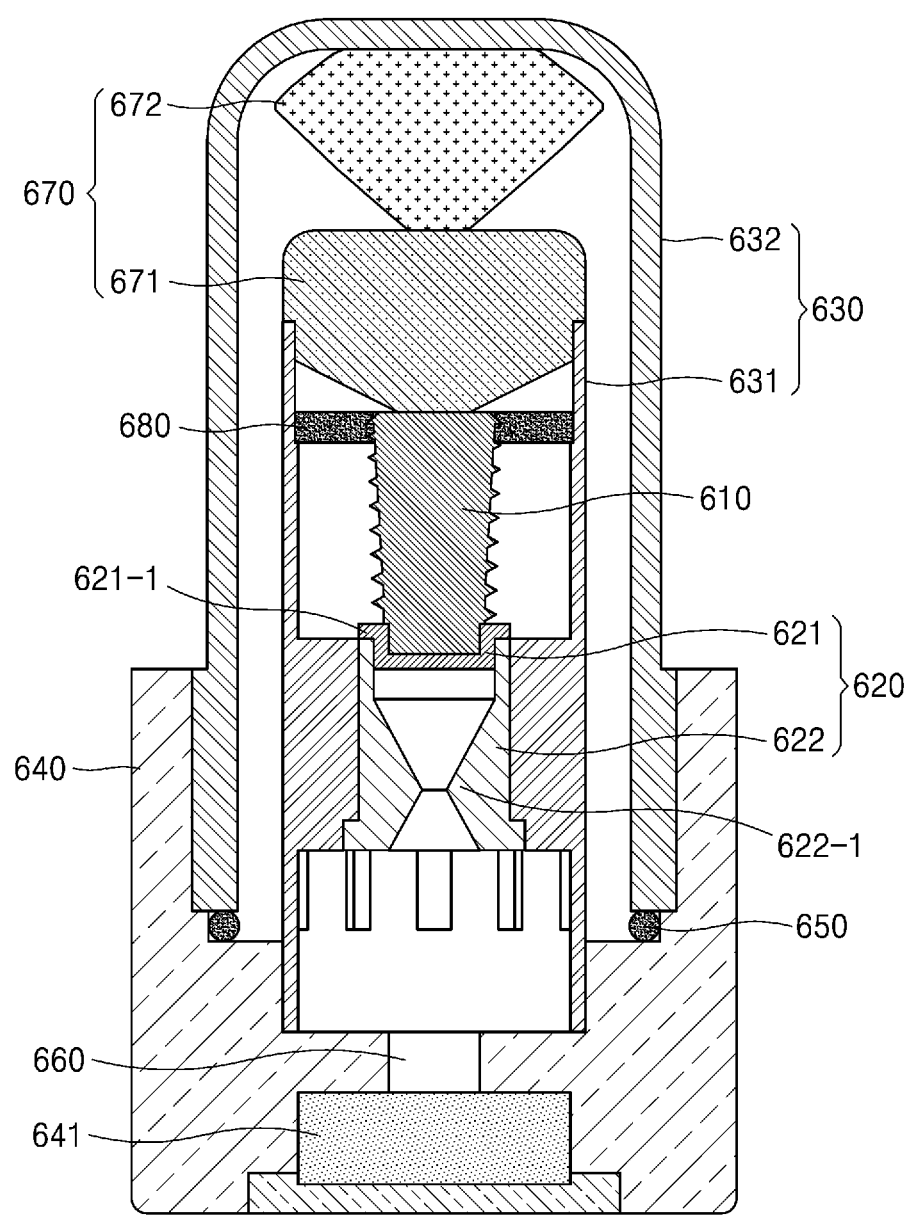
FIG. 7 is a cross-sectional view of the implant storage container taken along line A-A of FIG. 6.
Figure 8:
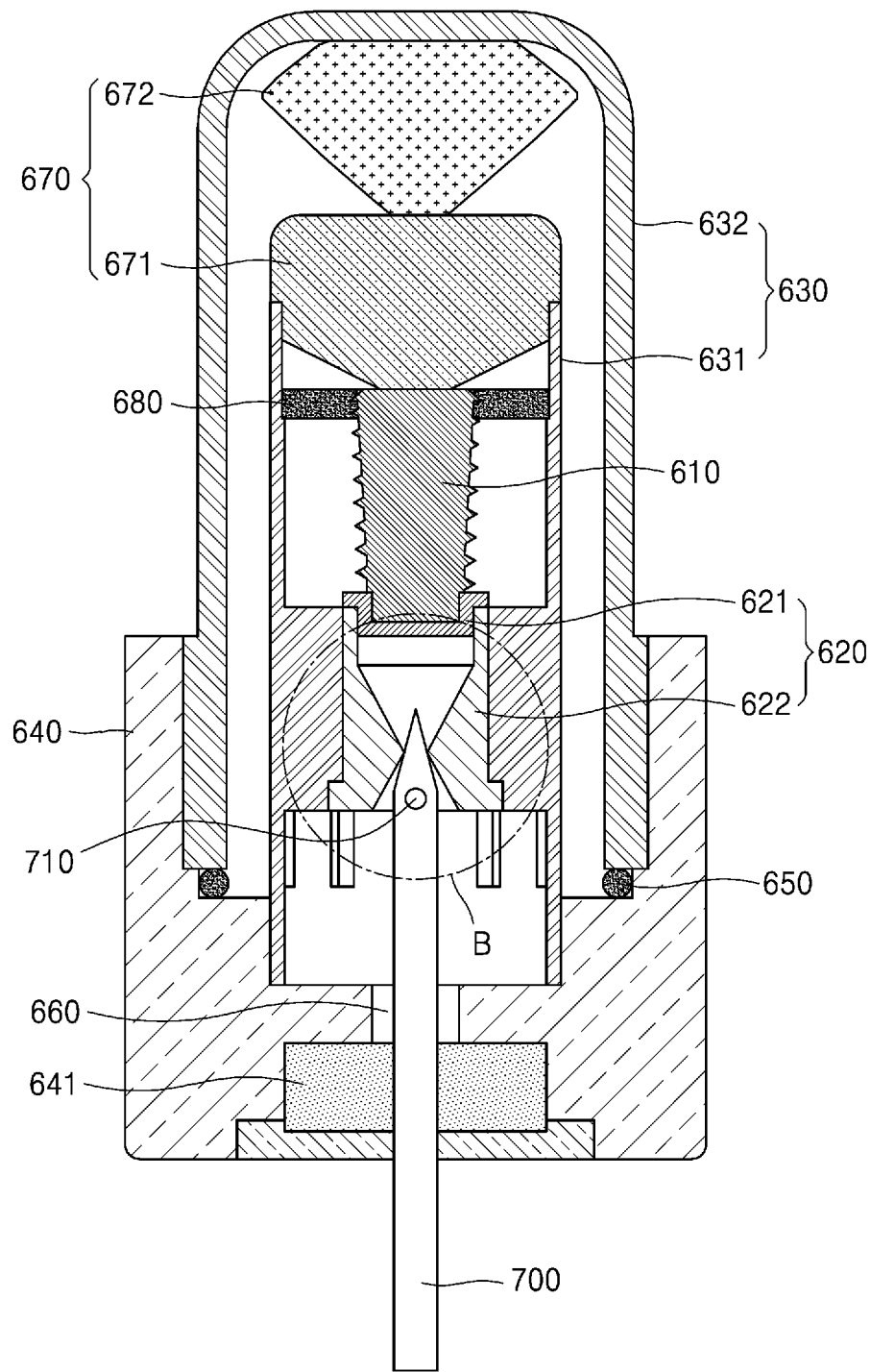
FIG. 8 is a cross-sectional view illustrating a case in which a contact portion is inserted in FIG. 7.

FIG. 7 is a schematic cross-sectional view of the implant storage container taken along line A-A of FIG. 6, and FIG. 8 is a cross-sectional view illustrating a case in which a contact portion is inserted in FIG. 7.

Referring further to FIGS. 7 and 8, the fixing portion 620 contacts a side portion of a contact portion 700 inserted into the cover 630 from the outside of the cover 630.

According to an embodiment, the contact portion 700 is connected to a power source to apply electricity to the fixing portion 620.

According to an embodiment, the fixing portion 620 and the target object 610 include a material through which electricity is conducted, and power received from the contact portion 700 is connected to the target object 610 through the fixing portion 620 so that the target object 610 becomes a power supply for generating plasma. Through this, the target object 610 functions as a high voltage portion when plasma is generated through dielectric barrier discharge.

According to an embodiment, the contact portion 700 is a needle having a pointed tip, includes a material through which electricity is conducted, and has an internal air circulation path, thereby simultaneously implementing the connection of electricity and internal exhaust.

According to an embodiment, a hole 710 for inhaling air during exhaust may be formed in the contact portion 700.

According to an embodiment, the cover 630 includes a penetrating portion 641 penetrated by the contact portion 700. The penetrating portion 641 includes an elastic material, and the inside of the cover 630 is sealed to maintain a vacuum state even though the penetrating portion 641 is penetrated by the contact portion 700. The penetrating portion 641 has a recovery force of closing the penetrated area when the contact portion 700 is separated from the penetrating portion 641.

According to an embodiment, the inside of the cover 630 may be in a vacuum state by exhausting internal air of the cover 630 by the contact portion 700, and the cover 630 is sealed to maintain the vacuum state.

According to an embodiment, the fixing portion 620 includes an inwardly convex protrusion 622-1 into which the contact portion 700 is inserted, and the protrusion 622-1 contacts the side portion of the contact portion 700 while moving in a direction in which the contact portion 700 is inserted.

Figure 9:
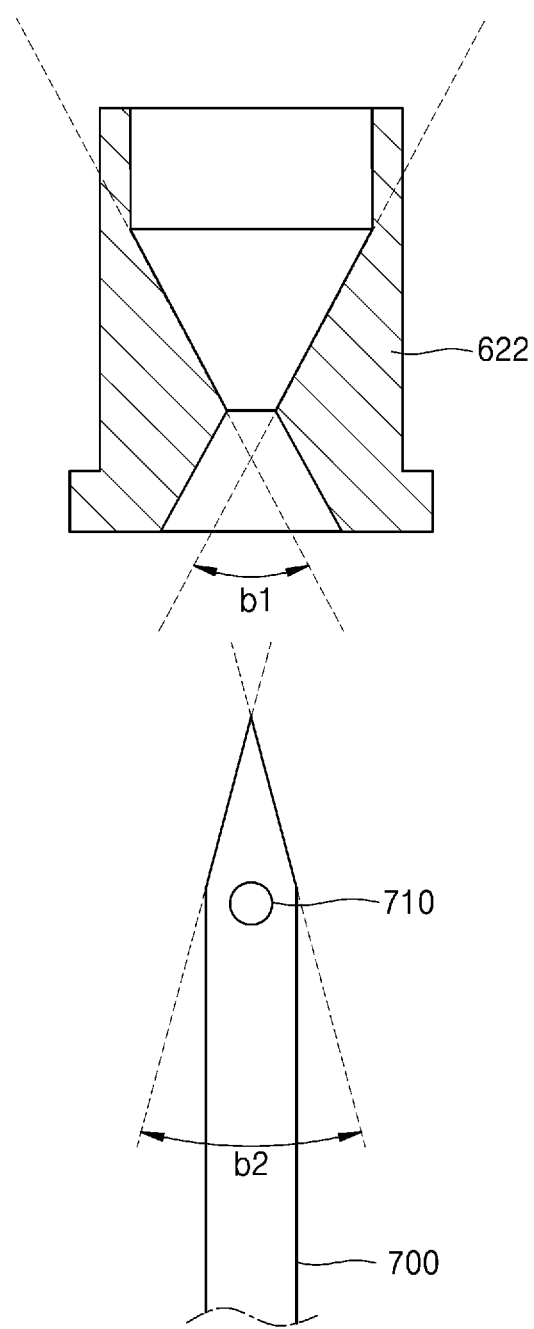
FIG. 9 is an enlarged view of portion B of FIG. 8.

FIG. 9 is an enlarged view of portion B of FIG. 8.

Referring further to FIG. 9, an inner angle b1 of an insertion groove formed by the protrusion 622-1 is greater than an inner angle b2 of a tip of the contact portion 700.

That is, the contact portion 700 is inserted into the insertion groove formed by the protrusion 622-1 to a certain depth, but is caught by the size of the inner angle and contacts the protrusion 622-1.

According to an embodiment, the inner angle b1 of the insertion groove formed by the protrusion 622-1 is greater than the inner angle b2 of the tip of the contact portion 700 such that the side portion of the contact portion 700 contacts the protrusion 622-1 in a state where the contact portion 700 is inserted into the insertion groove so that the tip of the contact portion 700 does not contact the fixed portion 620, and the insertion groove has a certain depth.

Through this, the protrusion 622-1 prevents the tip of the contact portion 700 from being damaged by contacting other members, and contacts the side portion of the contact portion 700 so that the tip of the contact portion 700 does not contact other members, thereby preventing the contact portion 700 from being further inserted.

In particular, because the protrusion 622-1 is in line or surface contact with the side portion of the contact portion 700, the degree of insertion of the contact portion 700 does not need to be adjusted very precisely. When the tip of the contact portion 700 is in point contact, precise tolerance management is required, but when the side portion of the contact portion 700 is in line or surface contact, reliability for electrical contact may be achieved with less precise tolerance management.

According to an embodiment, the contact portion 700 is electrically connected to the target object 610 such that electricity is not applied to the target object 610 through point contact in which the tip of the contact portion 700 is damaged, and the side portion of the contact portion 700 applies electricity to the target object 610 through line or surface contact.

According to an embodiment, the fixing portion 620 includes a first fixing member 621 in contact with the target object 610 and a second fixing member 622 combined with the first fixing member 621.

According to an embodiment, the first fixing member 621 is a stopper, includes a titanium material that is the same material as that of the target object 610, and fixes the target object 610 such that there is no vertical or rotational movement.

According to the embodiment, the second fixing member 622 includes an aluminum material and is physically bonded to the first fixing member 621.

Through this, the contact portion 700 may reduce damage by contacting the second fixing member 622 having a lower hardness than that of the first fixing member 621.

According to an embodiment, the first fixing member 621 and the second fixing member 622 include a material through which electricity is conducted, and the second fixing member 622 contacts the contact portion 700 to transmit applied electricity to the target object 610.

According to an embodiment, the first fixing member 621 includes a D-cut portion 621-1 in which a portion of an outer circumferential surface is cut into a planar shape, and fixes the target object 610 so as not to rotate.

According to an embodiment, the second fixing member 622 includes a D-cut portion (not shown) in which a portion of an outer circumferential surface is cut into a planar shape, and fixes the target object 610 so as not to rotate.

According to an embodiment, the cover 630 includes an inner cover 631 storing the target object 610 and the fixing portion 620 and an outer cover 632 storing the inner cover 631, and the inner cover 631 and the outer cover 632 are apart from each other by a certain distance.

According to an embodiment, the inner cover 631 includes a path for distributing the internal air of the inner cover 631 toward the outer cover 632.

Through this, when air is exhausted by the contact portion 700, both the internal air of the inner cover 631 and internal air of the outer cover 632 are exhausted.

Through this, the inner cover 631 has a structure for applying electricity to the target object 610 and a shape for dielectric barrier discharge, and the outer cover 632 provides a structure in which the outside of a container is sealed to form and maintain a vacuum, and a safety insulated from the outside.

According to an embodiment, the outer cover 632 is a vacuum dielectric barrier discharge cover, which is transparent, and includes a polycarbonate material.

According to an embodiment, the inner cover 631 is a dielectric barrier discharge cover, which is transparent, and includes a polycarbonate material.

According to an embodiment, an implant storage container according to an embodiment further includes a sealing member 640 connected to the cover 630.

According to an embodiment, the sealing member 640 includes a penetrating portion 641 penetrated by the contact portion 700. The penetrating portion 641 includes an elastic material, and the inside of the cover 630 is sealed to maintain a vacuum state even though the penetrating portion 641 is penetrated by the contact portion 700.

According to an embodiment, the sealing member 640 and the penetrating portion 641 include an ABS material based on styrene, a silicone material having a hardness of 60, or a mixture thereof.

According to an embodiment, the implant storage container according to an embodiment further includes an elastic O-ring 650 or a sealing pad between the sealing member 640 and the cover 630.

According to an embodiment, the sealing member 640 is screwed with the cover 630, and as internal air is exhausted, the O-ring 650 or the sealing pad is pressed to perform sealing against a vacuum leak.

According to an embodiment, the O-ring 650 or the sealing pad includes a fluorocarbon material.

According to an embodiment, as the internal air of the outer cover 632 is exhausted, coupling between the inner cover 631 and the sealing member 640 is strengthened. The inner cover 631 is detachably coupled to the sealing member 640. For example, the inner cover 631 is fitted with the sealing member 640 and sealed to maintain an internal vacuum.

According to an embodiment, as the internal air of the outer cover 632 is exhausted, coupling between the outer cover 632 and the inner cover 631 is strengthened. The inner cover 631 is detachably coupled to the outer cover 632 and sealed to maintain an internal vacuum.

According to an embodiment, as the internal air of the outer cover 632 is exhausted, the pressure at the point, line, or surface where the inner cover 631 contacts the outer cover 632 or the sealing member 640 increases, thereby enhancing the fixing. For example, a cap portion 670 is elastic and connects the outer cover 632 to the inner cover 631, and is pressed with a certain pressure as the internal air of the outer cover 632 is exhausted to strengthen coupling between the outer cover 632 and the inner cover 631. On the contrary, the cap portion 670 recovers elasticity as the pressure decreases as the inside of the outer cover 632 is vented, thereby weakening the coupling between the outer cover 632 and the inner cover 631.

According to an embodiment, as the inside of the outer cover 632 is vented, the pressure at the point, line, or surface where the inner cover 631 contacts the outer cover 632 or the sealing member 640 decreases, thereby weakening the fixing.

Through this, when plasma surface treatment of the target object 610 stored in the implant storage container is completed, a user may remove the inner cover 631 from the implant storage container without touching the inner cover 631 when venting the inside of the implant storage container in a vacuum state.

In particular, when the user vents the inside of the implant storage container to separate the outer cover 632 and the sealing member 640, the inner cover 631 is detachably coupled to the sealing member 640 and separated from the outer cover 632. Thereafter, the user grabs a handle 672 of the cap portion 670 and separates the inner cover 631 connected to the sealing member 640 through an inner cap portion 671 from the sealing member 640 so that the target object 610 may be taken out.

According to an embodiment, the target object 610 is connected to a guide portion 680 or the inner cap portion 671, and may be located on the handle 672 side when the inner cover 631 is separated from the sealing member 640 through the handle 672.

That is, the inner cover 631 may be moved to an operating room, an operating table, or a tray without a user's contact, thereby preventing infection during this process.

According to an embodiment, the implant storage container according to an embodiment may further include the guide portion 680 including titanium, which is the same material as that of the target object 610 for fixing the target object 610 more firmly.

According to an embodiment, the target object 610 is fixed by having a lower portion in contact with the first fixing member 621 and an upper portion in contact with the guide portion 680.

According to an embodiment, the implant storage container according to an embodiment further includes the cap portion 670 connected to the guide portion 680.

According to an embodiment, the cap portion 670 is detachably connected to the guide portion 680, and the guide portion 680 is detachably connected to the target object 610 so that a user grabs the cap portion 670 and pulls it out of the implant storage container, thereby removing the guide portion 680 from the implant storage container without touching it.

According to an embodiment, the cap portion 670 includes the inner cap portion 671 covering an upper portion of the inner cover 631 and the handle 672 that applies a pressing force in contact with the outer cover 632 to prevent separation of the inner cap portion 671.

According to an embodiment, the inner cap portion 671 includes an ABS material based on styrene, and the handle 672 includes a polycarbonate material with an opaque color.

According to an embodiment, the implant storage container according to an embodiment further includes a path portion 660 for a movement path for contacting the protrusion 622-1 after the contact portion 700 is inserted by piercing the penetrating portion 641.

Figure 10:
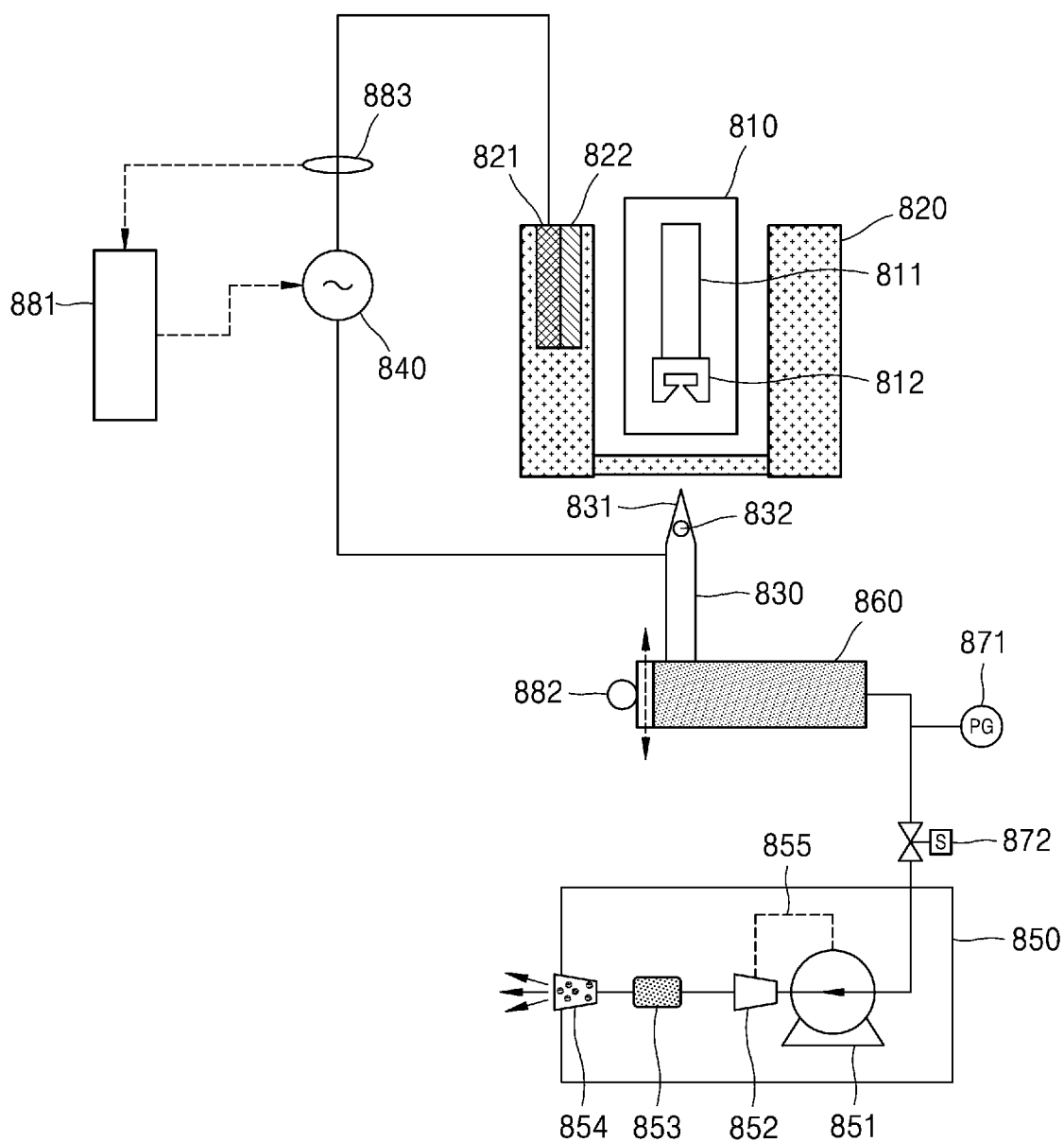
FIG. 10 is a configuration diagram of a plasma processing device according to an embodiment.

FIG. 10 is a configuration diagram of a plasma processing device according to an embodiment.

Referring to FIG. 10, the plasma processing device according to an embodiment includes a storage portion 820 for storing a container 810 in which a target object 811 is stored, a contact portion 830 electrically connected to the target object 811, and a power supply 840 that applies power for generating plasma to the target object 811 through the contact portion 830.

According to an embodiment, the target object 811 may be an implant body, and the container 810 may be an implant storage container storing the implant body.

According to an embodiment, the contact portion 830 is a needle including a tip portion 831 capable of penetrating an outer surface of the container 810 and includes a material through which electricity is conducted.

According to an embodiment, the contact portion 830 includes an air circulation path for exhausting internal air of the container 810 therein. That is, the contact portion 830 has a hollow tube shape.

Figure 11:
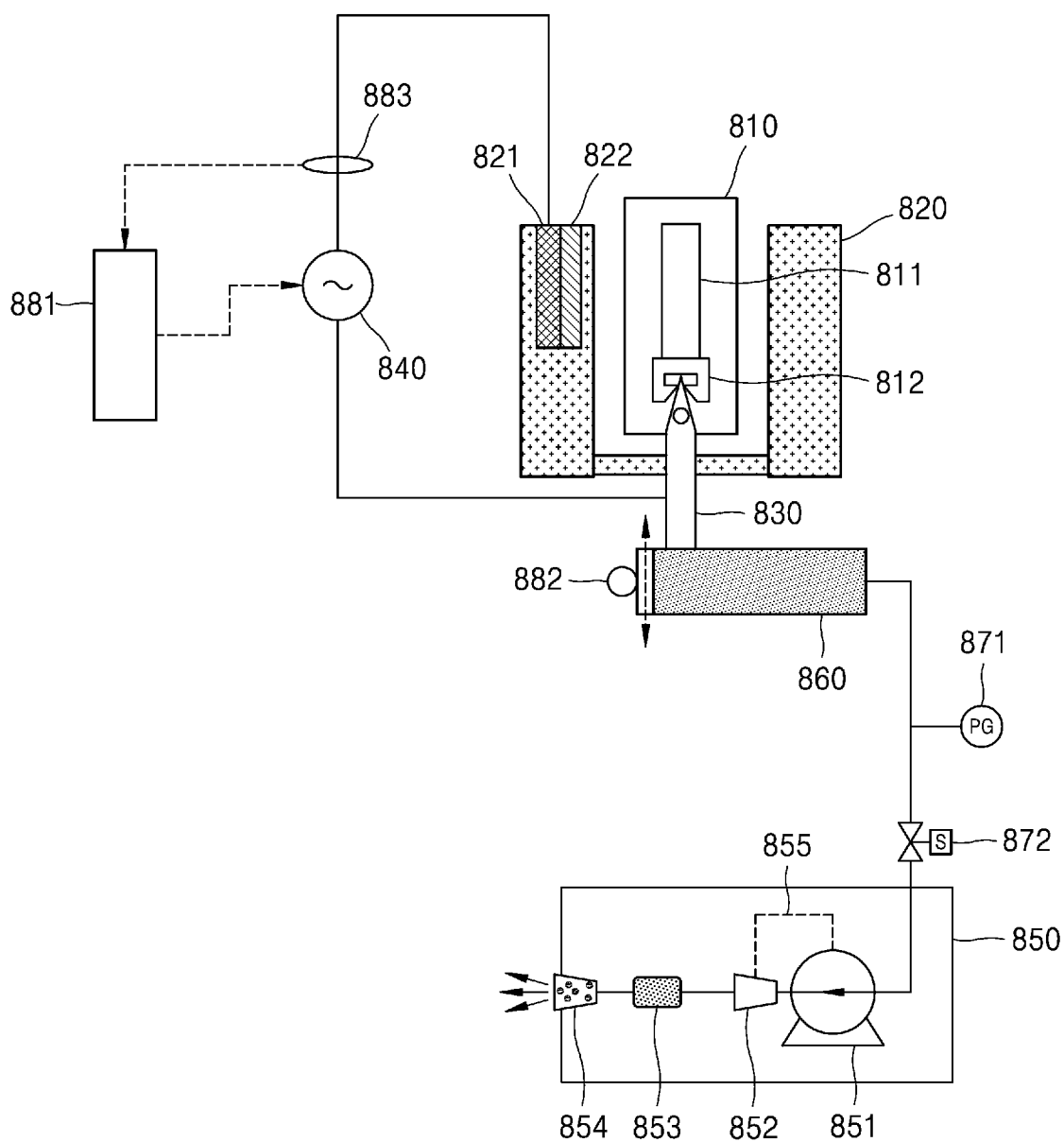
FIG. 11 is a configuration diagram illustrating a case in which a contact portion is inserted into a container in FIG. 10.

FIG. 11 is a configuration diagram illustrating a case in which a contact portion is inserted into a container in FIG. 10.

Referring further to FIG. 11, the contact portion 830 is inserted into the container 810, and a side portion of the contact portion 830 is electrically connected to the target object 811 through the contact portion 830.

According to an embodiment, the contact portion 830 is inserted into an insertion groove of a member 812 electrically connected to the target object 811, and the side portion of the contact portion 830 is electrically connected to an inner protrusion of the member 812.

According to an embodiment, a hole 832 for exhausting the internal air of the container 810 formed in the contact portion 830 is formed at a position farther from the target object 811 than an electrical contact between the contact portion 830 and the target object 811.

According to an embodiment, the hole 832 is formed at a position closer to a plasma processing device side than a line or surface where the side portion of the contact portion 830 and the member 812 contact. Through this, exhaust through the hole 832 strengthens binding of the contact portion 830 to the line or surface where the side portion of the contact portion 830 and the member 812 contact, thereby solving the problem that all the internal air of the container 810 is not exhausted.

According to an embodiment, when storing the container 810, the plasma processing device according to an embodiment further includes a ground electrode portion 821 that is connected to the power supply 840 and grounded, and adjacent to an outer peripheral surface of the container 810.

According to an embodiment, the storage portion 820 further includes a fixing portion (not shown) in which the container 810 is stored and fixed.

Preferably, the storage portion 820 further includes a sensor (not shown) that determines whether to store the container 810, and prevents an operation error of the plasma processing device according to whether to store the container 810 determined by the sensor.

According to an embodiment, the plasma processing device according to an embodiment further includes an exhaust portion 850 connected to an air flow path of the contact portion 830 to exhaust the internal air of the container 810.

According to an embodiment, the contact portion 830 includes a material through which electricity is conducted, and further includes an insulating portion 860 in a path of the contact portion 830 connected to the exhaust portion 850.

According to an embodiment, the power supply 840 is controlled by a power controller 881, and the power controller 881 controls the power supply 840 through information measured by a current measurer 883 that monitors a current generated by the power supply 840.

According to an embodiment, the storage portion 820 includes the ground electrode portion 821 and a dielectric portion 822.

According to an embodiment, the dielectric portion 822 is in contact with the ground electrode portion 821 and is configured to be adjacent to the container 810 than the ground electrode portion 821.

According to an embodiment, the plasma processing device according to an embodiment further includes a motion controller 882 that controls movement of the contact portion 830.

According to an embodiment, the motion controller 882 uses information received by a lower limit sensor and an upper limit sensor for the controlling movement of the contact portion 830 through a certain path.

According to an embodiment, the plasma processing device according to an embodiment further includes a pressure sensor 871 for measuring the pressure of exhausted air.

According to an embodiment, the plasma processing device according to an embodiment includes a valve 872 for driving or stopping an exhaust operation.

According to an embodiment, the exhaust portion 850 is independently configured by a housing that is apart from the plasma processing device.

According to an embodiment, the exhaust portion 850 includes an exhaust pump 851, a mist trap 852 for collecting oil drawn by the exhaust pump 851 through an oil collection path 855, and an ozone filter 853 and a high efficiency particulate air (HEPA) filter 854 for preventing contamination of air that is drawn out of the exhaust portion 850.

Figure 12:
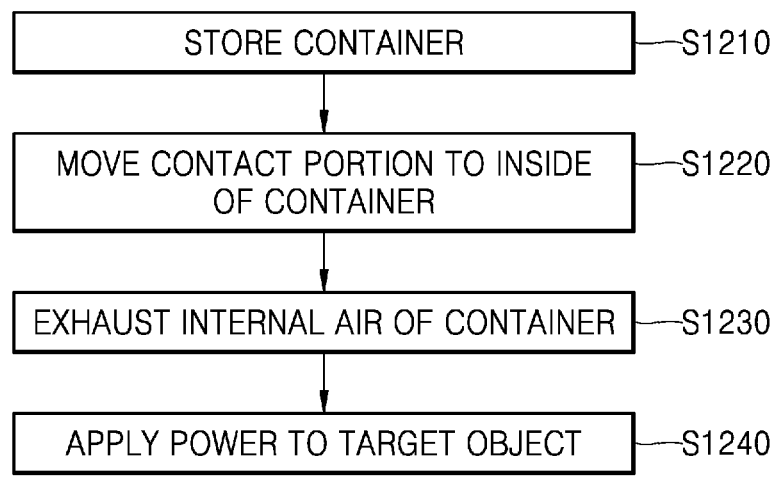
FIG. 12 is a flowchart illustrating a plasma processing method according to an embodiment.

FIG. 12 is a flowchart illustrating a plasma processing method according to an embodiment.

Referring to FIG. 12, a plasma processing method according to an embodiment includes operation S1210 of storing a container in which a target object is stored, operation S1220 of moving a contact portion to the inside of the container, operation S1230 of exhausting internal air of the container, and operation S1240 of applying power to the target object.

In operation S1210, a storage portion of a device stores the container in which the target object is stored.

In operation S1220, the contact portion of the device is moved to the inside of the container such that a side portion of the contact portion may be electrically connected to the target object.

In operation S1230, the contact portion of the device exhausts the internal air of the container.

In operation S1240, a power supply of the device applies power for generating plasma to the target object through the contact portion.

According to an embodiment, the plasma processing method according to an embodiment further includes detecting storage of the container and applying power only when the container is stored.

Figure 13:
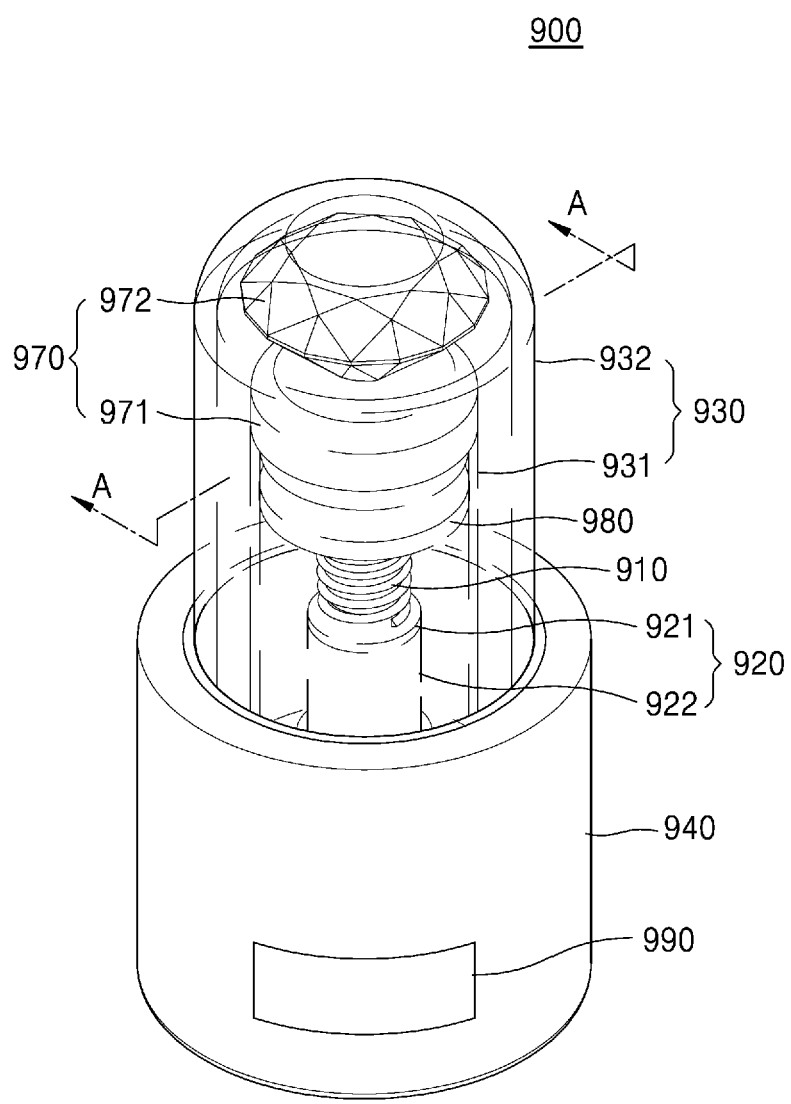
FIG. 13 is a perspective view of an implant storage container according to an embodiment.
Figure 14:
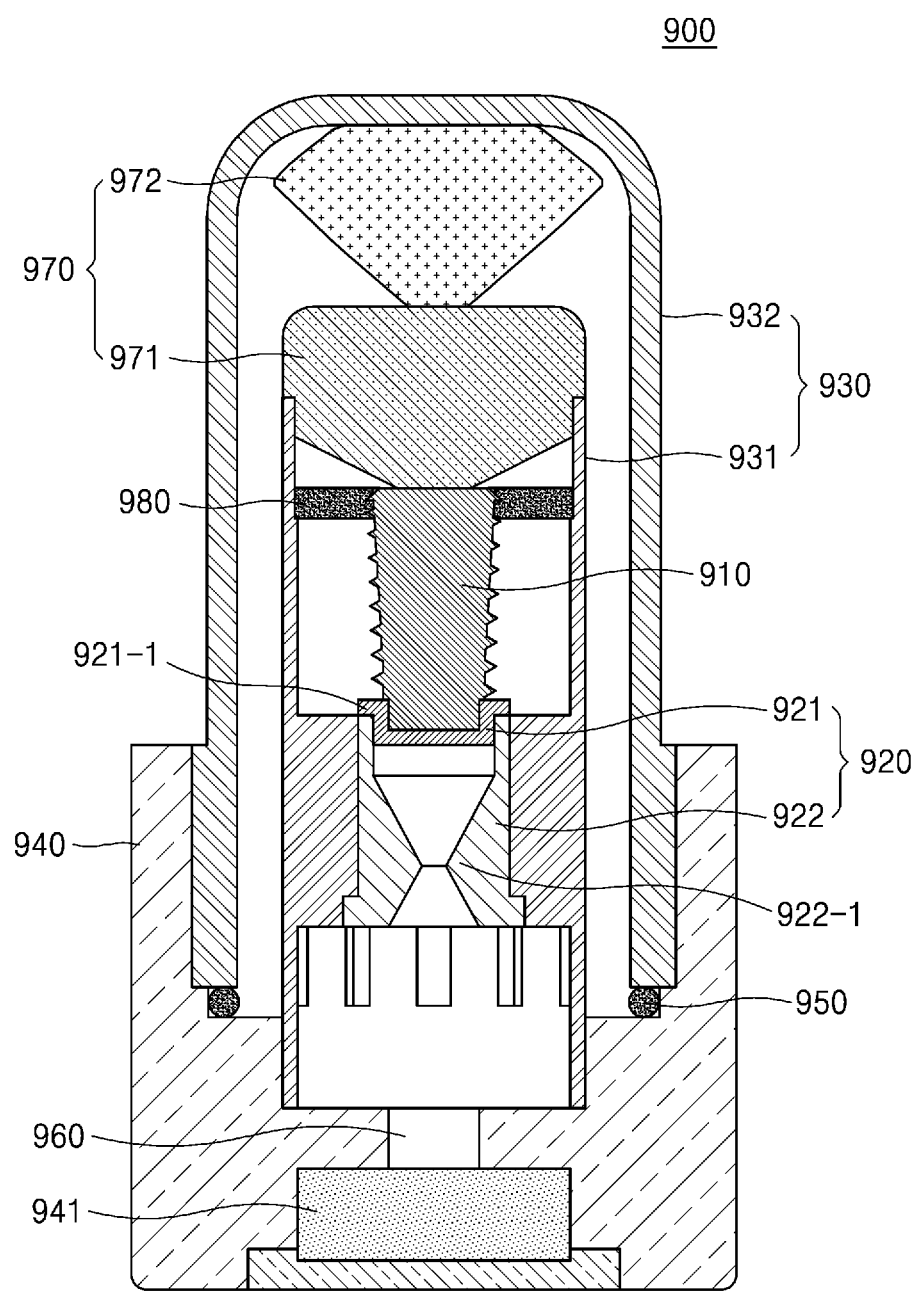
FIG. 14 is a cross-sectional view of the implant storage container taken along line A-A of FIG. 13, according to an embodiment.
Figure 15:
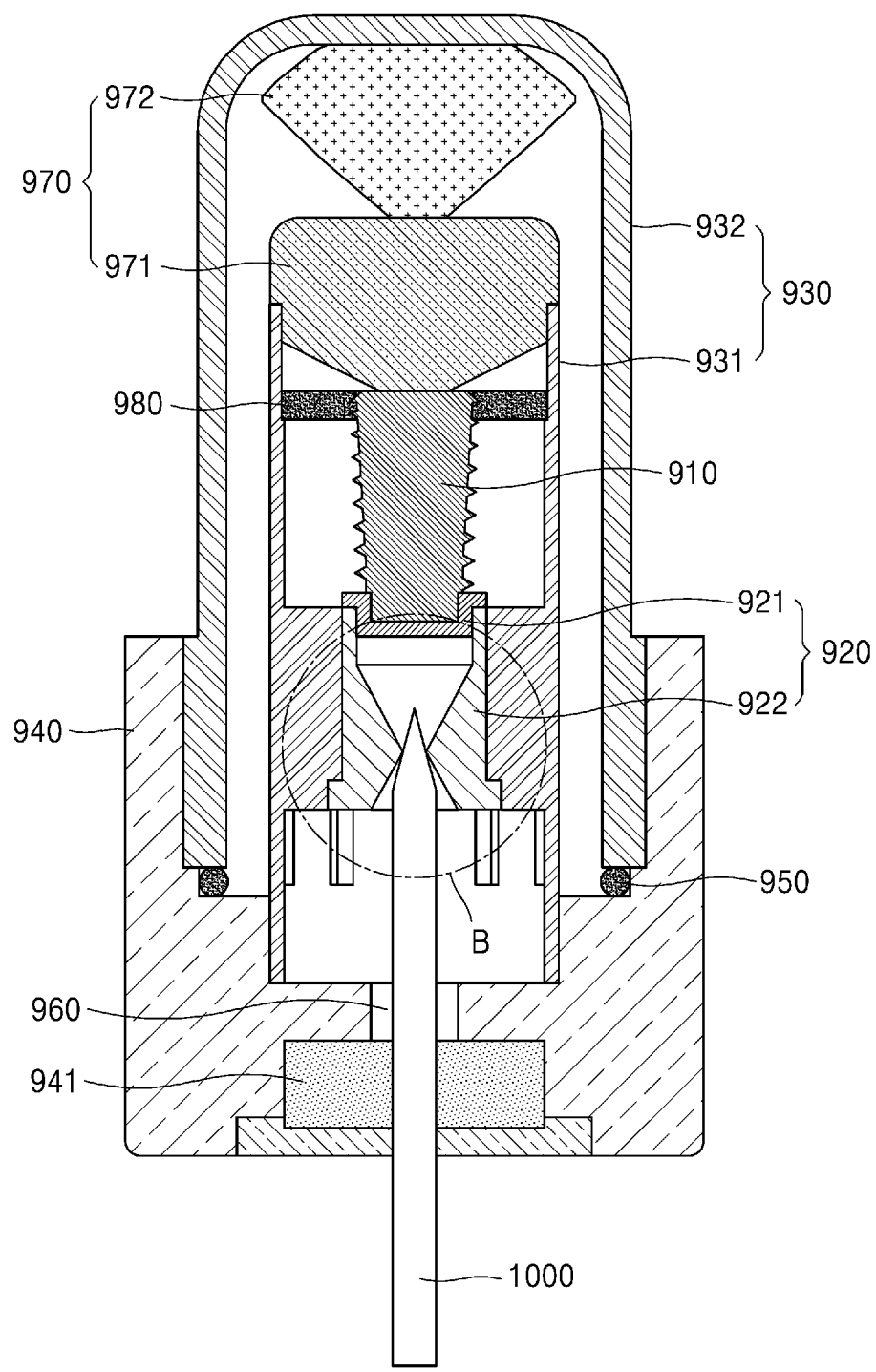
FIG. 15 is a view illustrating a state in which a contact portion is inserted into the implant storage container in FIG. 14.

FIG. 13 is a perspective view of an implant storage container according to an embodiment, FIG. 14 is a cross-sectional view of the implant storage container taken along line A-A of FIG. 13, and FIG. 15 is a view illustrating a state in which a contact portion is inserted into the implant storage container in FIG. 14.

Referring to FIGS. 13 to 15, an implant storage container 900 according to an embodiment includes an implant body 910, a fixing portion 920, a cover 930, a storage container body 940, a penetrating portion 941, a sealing member 950, a path portion 960, a cap portion 970, and a guide portion 980.

The implant storage container 900 may store the implant body 910 while accommodating the implant body 910 therein. The implant storage container 900 may be referred to as an implant ampoule or the like.

The implant body 910 may be a target to be stored by the implant storage container 900 and may be a target to be plasma treated when plasma treatment is performed with the implant storage container 900.

According to an embodiment, the implant body 910 may broadly mean a portion of an implant requiring plasma treatment. For example, the implant body 910 may be an implant fixture, but is not limited thereto.

The fixing portion 920 may contact the implant body 910 to fix the implant body 910.

According to an embodiment, the fixing portion 920 may include a first fixing member 921 and a second fixing member 922.

The first fixing member 921 may be in contact with the implant body 910 to fix the implant body 910 such that the implant body 910 does not move in a vertical or horizontal direction or a rotational direction.

According to an embodiment, the first fixing member 921 may be implemented as a material through which electricity is conducted.

According to an embodiment, the first fixing member 921 may be implemented with the same material (e.g., titanium) as that of the implant body 910.

According to an embodiment, the first fixing member 921 may include a D-cut portion 921-1 in which a portion of an outer circumferential surface thereof is cut into a planar shape. In this case, the D-cut portion 921-1 may be engaged with a lower end of the implant body 910 to prevent the implant body 910 from moving.

The second fixing member 922 is configured to contact the first fixing member 921. When a contact portion 1000 for voltage application is inserted into the implant storage container 900, the second fixing member 922 has a structure in which the contact portion 1000 may stably contact the second fixing member 922 without damage.

According to an embodiment, the second fixing member 922 may be implemented as a material having a relatively low hardness (e.g., aluminum) compared to the first fixing member 921 while electricity is conducted.

Referring to FIG. 15 together, in a case of applying a voltage through the contact portion 1000 to plasma the implant body 910, the contact portion 1000 may apply a voltage in contact with the fixing portion 920, for example, the second fixing member 922 of the fixing portion 920. The voltage applied to the fixing portion 920 is transmitted to the implant body 910, and the implant body 910 may operate as one electrode used for dielectric barrier discharge as the voltage is applied.

According to an embodiment, the fixing portion 920, for example, the first fixing member 921 and the second fixing member 922 constituting the fixing portion 920 may include a material through which electricity is conducted.

According to an embodiment, the fixing portion 920 may include a protrusion 922-1 protruding convexly inward into which the contact portion 1000 is inserted. When the contact portion 1000 is inserted, the protrusion 922-1 may contact a side portion of the contact portion 1000 to receive a voltage.

The cover 930 may store the implant body 910 therein.

According to an embodiment, the cover 930 may include a transparent material. According to an embodiment, the cover 930 may include a polycarbonate material.

The cover 930 is connected to the storage container body 940, which will be described later below to keep the inside thereof sealed.

The cover 930 may include an inner cover 931 storing the implant body 910 and an outer cover 932 storing the inner cover 931.

According to an embodiment, the inner cover 931 and the outer cover 932 may be apart from each other by a certain distance.

According to an embodiment, the inner cover 931 may include a path for distributing the inner gas of the inner cover 931 toward the outer cover 932. In this case, gas may freely move between the inside and the outside of the inner cover 931.

According to an embodiment, each of the inner cover 931 and the outer cover 932 may include a polycarbonate material.

According to an embodiment, either the inner cover 931 or the outer cover 932 may be omitted.

The storage container body 940 may be connected to the cover 930 to maintain the interior thereof filled with a discharge gas used for plasma discharge in a sealed state according to a preset composition ratio.

In the present specification, the "storage container body" may broadly mean a structure constituting at least a portion of the implant storage container 900.

According to an embodiment, the sealing member 950 that seals a boundary between the storage container body 940 and the cover 930 may be included between the storage container body 940 and the cover 930.

According to an embodiment, the sealing member 950 may include an elastic material.

According to an embodiment, an internal gas environment may be maintained at lower atmospheric pressure than air pressure. In this case, the sealing member 950 may be compressed according to the pressure generated due to a difference between air pressure and atmospheric pressure inside the implant storage container 900 to maintain a sealed state.

According to an embodiment, the sealing member 950 may be an O-ring or a sealing pad.

According to an embodiment, the internal gas environment may include an environment such as a composition ratio of a discharge gas and internal pressure of the discharge gas.

According to an embodiment, the storage container body 940 may be screwed to the cover 930.

The discharge gas may be filled in an inner space sealed by the cover 930 (e.g., the outer cover 932) and the storage container body 940.

According to an embodiment, the discharge gas may include helium gas, neon gas, argon gas, krypton gas, xenon gas, radon gas, xenon gas, nitrogen gas, hydrogen selenide gas, deuterium gas, fluorine gas, chlorine gas, bromine gas, iodine gas, hydrogen gas, mercury gas, or a combination of the above gases.

According to an embodiment, the storage container body 940 may include an ABS material based on styrene, a silicone material, or a mixture thereof, but is not limited thereto.

The penetrating portion 941 and a path portion 960 may be formed at the lower portion of the storage container body 940.

The penetrating portion 941 includes an elastic material, and may be configured such that a gas distribution path is temporarily formed when a discharge gas is injected into the implant storage container 900 and then closed again to enable recovery.

The penetrating portion 941 is configured to be penetrable by the contact portion 1000, and when the penetrating portion 941 is penetrated by the contact portion 1000, the penetrated portion is in close contact with the contact portion 1000 so that the penetrating portion 941 may maintain an internal gas environment of a discharge gas filled in an inner space sealed by the cover 930 and the storage container body 940 in a sealed state.

According to an embodiment, the penetrating portion 941 may include an ABS material based on styrene, a silicone material, or a mixture thereof, but is not limited thereto.

When the contact portion 1000 is inserted into the implant storage container 900, the path portion 960 may provide a path through which the contact portion 1000 penetrates the penetrating portion 941 and then moves.

The cap portion 970 may include an inner cap portion 971 and a handle 972.

The inner cap portion 971 includes an elastic material, and may be maintained in a pressed state between the inner cover 931 and the outer cover 932 when the cover 930 and the storage container body 940 are sealed.

According to an embodiment, the inner cap portion 971 may include an ABS material based on styrene, a silicone material, or a mixture thereof, but is not limited thereto.

When the inside of the implant storage container 900 is vented after plasma treatment for the implant body 910 in the implant storage container 900 is completed, the inner cover 931 and the outer cover 932 receive a force in a direction away from each other by resilience of the inner cap portion 971. Accordingly, the inner cover 931 and the outer cover 932 may be separated from each other without touching.

After the inner cover 931 and the outer cover 932 are separated from each other, a user may separate the inner cover 931 including the plasma-treated implant body 910 from the storage container body 940 by pulling the handle 972.

According to an embodiment, the implant body 910 is connected to the guide portion 980 or the inner cap portion 971, and when the inner cover 931 is separated from the storage container body 940 by the user pulling the handle 972, the implant body 910 may be located on the inner cover 931 side.

Because the separation of the inner cover 931 and the outer cover 932 is performed at the final use stage, with respect to the inner cover 931, external infection may be minimized by blocking contact except for a person who finally handles the implant body 910.

According to an embodiment, the cap portion 970 is connected to the guide portion 980, and the guide portion 980 may be in contact with an upper portion of the implant body 910 to fix the implant body 910.

An outer surface of the storage container body 940 may include a display unit 990 that displays information about an internal gas environment.

According to an embodiment, the display unit 990 may be on an outer surface of the cover 930, for example, the outer cover 932.

According to an embodiment, the display unit 990 may display at least one of the type of a discharge gas filled in the implant storage container 900, a composition ratio of the discharge gas, an internal pressure of the discharge gas, and a usable period.

Figure 16:
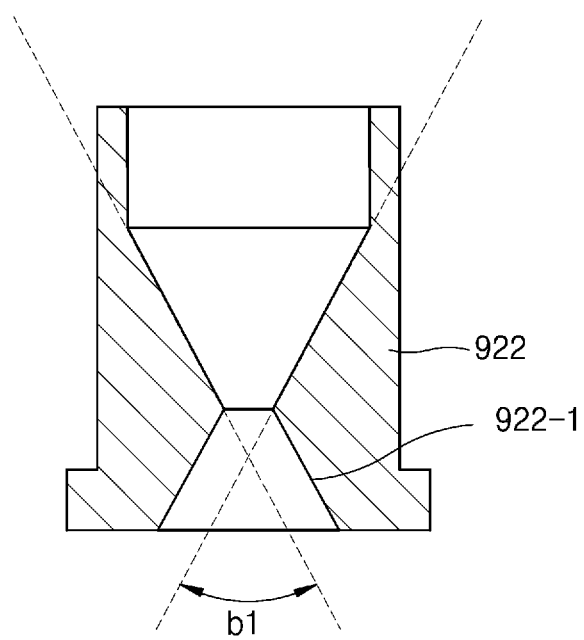
FIG. 16 is an enlarged view of portion B of FIG. 15.
Figure 16:
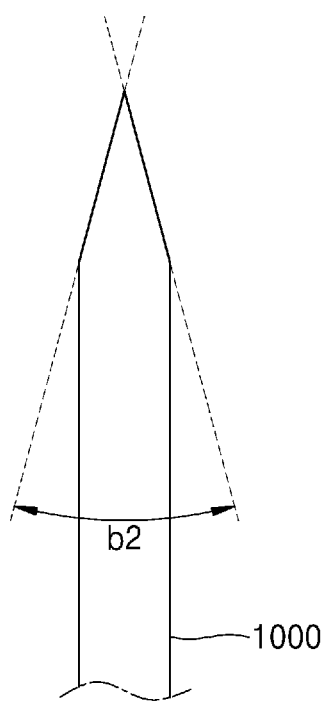

FIG. 16 is an enlarged view of portion B of FIG. 15.

Referring to FIGS. 13 to 16, the inner angle b1 of an insertion groove formed by the protrusion 922-1 may be greater than the inner angle b2 of a tip of the contact portion 1000.

In this case, the contact portion 1000 is inserted into the insertion groove formed by the protrusion 922-1 to a certain depth and then contacts the protrusion 922-1 while being caught on the protrusion 922-1.

According to an embodiment, the size of the inner angle b1 of the insertion groove formed by the protrusion 922-1 may be set such that a side portion of the contact portion 1000 contacts the protrusion 922-1 while the contact portion 1000 is inserted and the tip of the contact portion 1000 does not contact the first fixing member 921. That is, the protrusion 922-1 may be implemented such that the side portion of the contact portion 1000 may stably contact the protrusion 922-1 while preventing damage due to the contact of the tip of the contact portion 1000 with another member.

According to an embodiment, the inner angle b1 of the insertion groove may have the same value as that of the inner angle b2 of the tip of the contact portion 1000.

Because the protrusion 922-1 is in line or surface contact with the side portion of the contact portion 1000, even if there is a slight error in the degree of insertion of the contact portion 1000, a voltage may be applied through stable contact. That is, the contact portion 1000 allows the side portion of the contact portion 1000 to apply a voltage to the implant body 910 through the fixing portion 920 by making line or surface contact with the protrusion 922-1.

Figure 17:
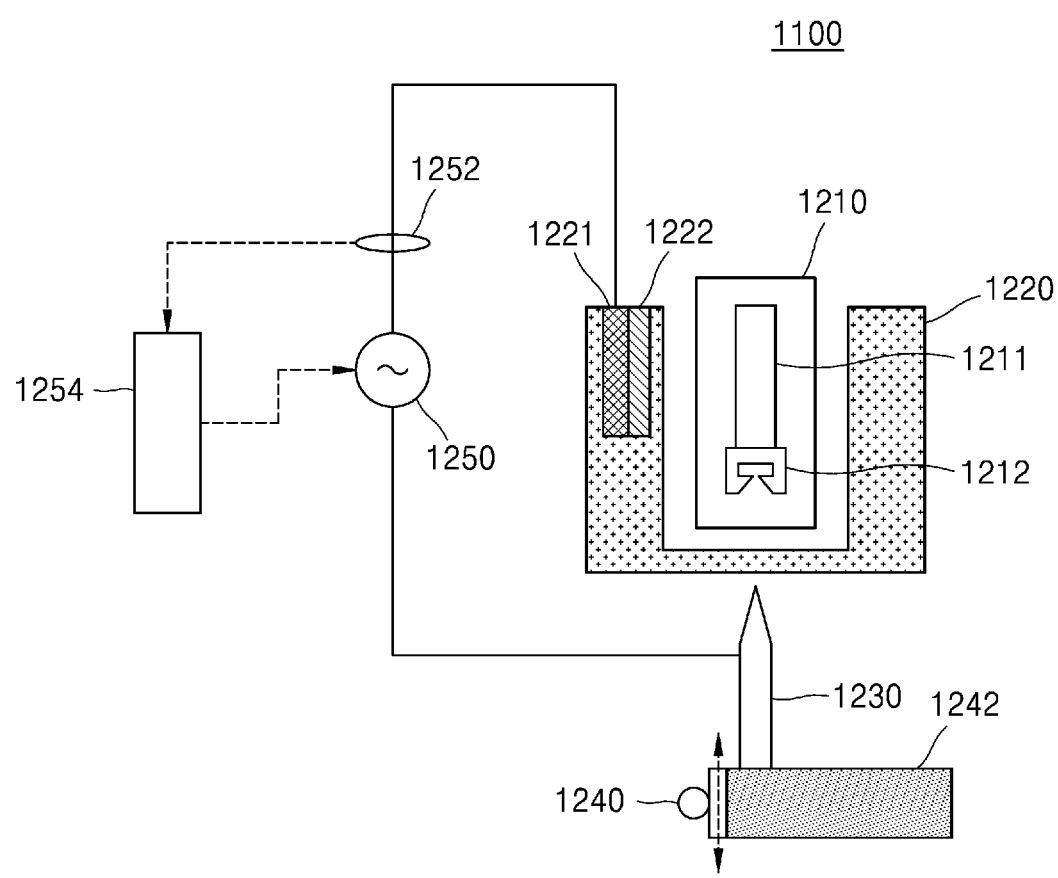
FIG. 17 is a schematic view of a plasma processing system according to an embodiment.
Figure 18:
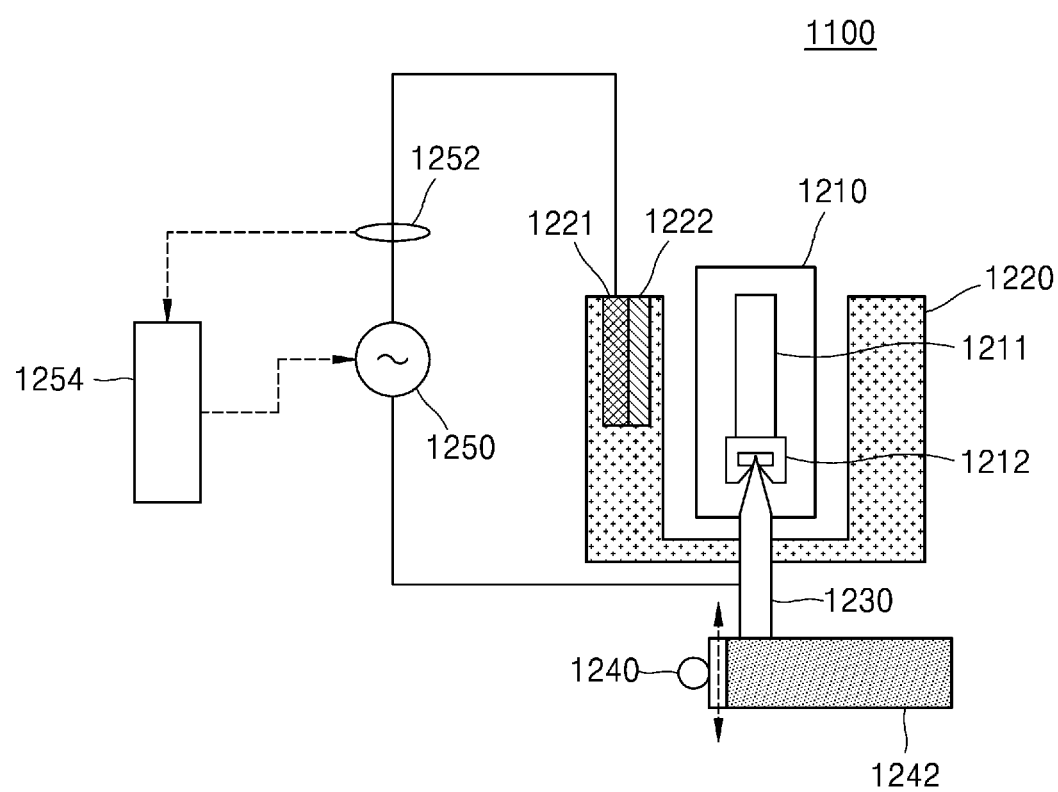
FIG. 18 is a view illustrating a state in which a contact portion is inserted into an implant storage container in the plasma processing system of FIG. 17.

FIG. 17 is a schematic view of a plasma processing system according to an embodiment. FIG. 18 is a view illustrating a state in which a contact portion is inserted into an implant storage container in the plasma processing system of FIG. 17.

Referring to FIGS. 17 and 18, a plasma processing system 1100 according to an embodiment may include an implant storage container 1210, a storage portion 1220, a ground electrode portion 1221, a dielectric portion 1222, a contact portion 1230, and a driver 1240, an insulating portion 1242, a power supply 1250, a current measurer 1252, and a power controller 1254.

According to an embodiment, the storage portion 1220, the ground electrode portion 1221, the dielectric portion 1222, the contact portion 1230, the driver 1240, the insulating portion 1242, the power supply 1250, the current measurer 1252, and power controller 1254 may be implemented in the same form as a plasma processing device separate from the implant storage container 1210.

The implant storage container 1210 of FIGS. 17 and 18 shows only an implant body 1211 and a fixing portion 1212 stored in a cover for convenience of explanation. However, the implant storage container 1210 may be the implant storage container 900 according to an embodiment shown in FIGS. 13 to 15.

The storage portion 1220 of the plasma processing device provides a space for storing the implant storage container 1210.

The storage portion 1220 may include the ground electrode portion 1221 and the dielectric portion 1222 arranged adjacent to an outer circumferential surface of the implant storage container 1210.

The ground electrode portion 1221 may be connected to a ground terminal of the power supply 1250 to function as a ground electrode.

The dielectric portion 1222 includes a dielectric material, and may be included in the storage portion 1220 to increase the effect of plasma barrier discharge, but the dielectric portion 1222 may not be included in the storage portion 1220 in some embodiments.

According to an embodiment, the dielectric portion 1222 may be configured to be closer to the implant storage container 1210 than the ground electrode portion 1221.

The contact portion 1230 is inserted into the implant storage container 1210 so that a side portion of the contact portion 1230 may contact the fixing portion 1212. Accordingly, the contact portion 1230 may apply a voltage received from the power supply 1250 to the implant body 1211 through the fixing portion 1212.

The driver 1240 may control movement of the contact portion 1230, for example, a vertical movement.

According to an embodiment, the driver 1240 may use sensing information collected from a lower limit sensor and an upper limit sensor such that the contact portion 1230 may move a certain distance through a certain path.

According to an embodiment, the driver 1240 may include a motor for moving the contact portion 1230.

According to another embodiment, the driver 1240 may be replaced with a non-powered elastic material. In this case, the driver 1240 may fix the position of the contact portion 1230 through the elastic material and insert the contact portion 1230 into the implant storage container 1210 using resilience of the elastic material when the implant storage container 1210 is inserted into the storage portion 1220. For example, the driver 1240 may include a spring having certain elasticity.

The insulating portion 1242 may maintain an insulating state between the contact portion 1230 including a material through which electricity is conducted and another component (e.g., the driver 1240).

The power supply 1250 may apply power for plasma generation to the implant body 1211 through the contact portion 1230.

The current measurer 1252 may monitor a current provided by the power supply 1250 and transmit information about the monitored current to the power controller 1254.

The power controller 1254 may control the applied power by using the information about the monitored current received from the current measurer 1252.

The invention claimed is:

1. An implant storage container comprising:
   an implant body;
   a holding block connected to the implant body;
   a cover storing the implant body and connected to the holding block; and
   a sealing member configured to seal a boundary between the holding block and the cover to maintain a vacuum state inside the cover,
   wherein the sealing member includes a recoverable elastic material, and when internal air of the cover is exhausted, an air circulation path is temporarily formed in the sealing member and then closed.

2. The implant storage container of claim 1, wherein the sealing member is an elastic O-ring or sealing pad.

3. The implant storage container of claim 1, wherein the cover includes an inner cover storing the implant body and an outer cover storing the inner cover, and the sealing member seals a boundary between the outer cover and the holding block to maintain a vacuum state inside the outer cover.

4. The implant storage container of claim 3, wherein the inner cover includes a path for circulating internal air from the inner cover to the outer cover.

5. The implant storage container of claim 3, wherein, when the outer cover is separated from the holding block, the inner cover is separated from both the outer cover and the holding block.

6. The implant storage container of claim 3, wherein the inner cover includes a dielectric area for dielectric barrier discharge.

7. The implant storage container of claim 1, wherein the holding block includes a hole for exhausting internal air of the cover.

8. The implant storage container of claim 7, wherein the hole includes a recovery structure for maintaining an inside of the cover in a vacuum after the internal air of the cover is exhausted.

9. The implant storage container of claim 8, wherein, in the recovery structure, when the internal air of the cover is exhausted, the air circulation path is temporarily formed in the recovery structure and then closed so that the inside of the cover maintains the vacuum.

10. The implant storage container of claim 1, wherein the cover includes a valve port for exhausting internal air of the cover.

11. The implant storage container of claim 1, further comprising:
    an electrical terminal on an outer surface of the holding block; and
    an electrical connector configured to connect the electrical terminal to the implant body.

12. The implant storage container of claim 1, wherein the cover includes a dielectric area for dielectric barrier discharge.

13. The implant storage container of claim 12, wherein the dielectric area is capable of transmitting ultraviolet rays.

* * * * *